United States Patent
Kawahara et al.

(10) Patent No.: US 7,333,262 B2
(45) Date of Patent: Feb. 19, 2008

(54) OPTICAL AMPLIFYING METHOD, OPTICAL AMPLIFYING APPARATUS, AND OPTICAL AMPLIFIED TRANSMISSION SYSTEM USING THE APPARATUS

(75) Inventors: Ryo Kawahara, Tokyo (JP); Masaru Fukushima, Tokyo (JP); Nobuyuki Kagi, Tokyo (JP); Kensaku Sekiya, Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 33 days.

(21) Appl. No.: 10/775,103

(22) Filed: Feb. 11, 2004

(65) Prior Publication Data
US 2004/0156094 A1 Aug. 12, 2004

(30) Foreign Application Priority Data
Feb. 12, 2003 (JP) ............................. 2003-034135
Nov. 27, 2003 (JP) ............................. 2003-397952

(51) Int. Cl.
*H04B 10/12* (2006.01)
(52) U.S. Cl. .................................................. 359/337.1
(58) Field of Classification Search ........... 359/341.41, 359/341.1, 337
See application file for complete search history.

(56) References Cited
U.S. PATENT DOCUMENTS

| 6,366,395 | B1* | 4/2002 | Drake et al. | ............ | 359/341.41 |
| 6,414,788 | B1* | 7/2002 | Ye et al. | ................. | 359/341.41 |
| 2001/0040720 | A1* | 11/2001 | Gerrish et al. | ......... | 359/341.41 |
| 2001/0040721 | A1* | 11/2001 | Gerrish et al. | ......... | 359/341.41 |
| 2002/0093729 | A1* | 7/2002 | Gerish et al. | .......... | 359/341.41 |
| 2003/0011880 | A1* | 1/2003 | Kim et al. | ............. | 359/341.41 |
| 2004/0051938 | A1* | 3/2004 | Chan et al. | .............. | 359/337.1 |
| 2004/0240044 | A1* | 12/2004 | Park et al. | ............. | 359/341.41 |
| 2005/0116147 | A1 | 6/2005 | Oota et al. | | |

OTHER PUBLICATIONS

Freund, Wilson. Statistical Methods 2nd Ed. Academic Press. San Diego, CA. pp. 236-240. Pub. Date: Dec. 23, 2002.*

* cited by examiner

*Primary Examiner*—Jack Keith
*Assistant Examiner*—Ari M. Diacou
(74) *Attorney, Agent, or Firm*—Oblon, Spivak, McClelland, Maier & Neustadt, P.C.

(57) ABSTRACT

A proportional constant adjusting circuit is arranged in the AGC circuit of the optical amplifying apparatus, and the proportional constant of the proportional circuit is continuously adjusted in correspondence to the optical input power monitored by the PD and the logarithmic transformation circuit. The AGC circuit controls the pump LD based on the monitored optical input/output power so as to control the gain of the optical amplifier to be a requested value.

11 Claims, 19 Drawing Sheets

OPTICAL AMPLIFYING METHOD, OPTICAL AMPLIFYING APPARATUS, AND OPTICAL AMPLIFIED TRANSMISSION SYSTEM USING THE APPARATUS

BACKGROUND OF THE INVENTION

1. Field of the Invention

The present invention relates to an optical amplifying method for adjusting control parameters in an automatic constant gain control circuit to control gain of an optical amplifier, an optical amplifying apparatus and an optical amplified transmission system using the apparatus.

2. Related Art

A conventional optical amplifying apparatus 110, for example as shown in FIG. 19, includes an optical amplifier 111 connected to an optical transmission line 101. An optical signal inputted into the optical amplifier 111 and an optical signal outputted from the optical amplifier 111 and passed through an erbium-doped fiber (EDF) 112 are divided by optical couplers 113, 114 respectively, and then optical input power and optical output power thereof are detected by photo diodes (PD) respectively in the optical amplifying apparatus 110. The optical input power and the optical output power are converted to voltages corresponding to the optical powers in monitor circuits 117, 118, and the voltages are outputted to a control circuit 119, respectively. The control circuit 119 controls a pump laser diode 120 based on the voltages to implement an automatic constant gain control (AGC) in the optical amplifier 111, thus controlling the gain of the optical amplifier to be a prescribed value.

As one of the optical transmission system, there is a wavelength division multiplexing (WDM) system in which a plurality of optical signals of different wavelengths are division-multiplexed and simultaneously transmitted on a single fiber-optical transmission line. The optical signals are optically amplified through a plurality of optical amplifying apparatuses placed in the optical transmission line, and then transmitted to an optical transmission line of a single-mode fiber (SMF) or a dispersion-shifted fiber (DSF) in the WDM system.

In the optical amplifying apparatus implementing the AGC, the optical output power is controlled so as to maintain the gain to be constant, when the number of wavelengths in the WDM optical signal varies and the optical input power to the optical amplifier varies accordingly. However, when a transient characteristics of power control of the optical amplifier is not appropriate in the transitional period when the optical input power abruptly varies, the control of the optical output power corresponding to a variation of the optical input power of the optical amplifier is delayed. FIG. 20A shows the variation of the optical input power of the optical amplifier. FIG. 20B shows the result (i.e., delay). In this case, the optical output power per one wavelength channel largely varies (refer to FIG. 20C), thus deteriorating the transmission quality of the optical signal in the transitional period when the optical input power abruptly varies.

Japanese Patent Provisional Publication No. 2001-053682 discloses an optical amplifying apparatus providing a delay portion on the optical transmission line in which the variation of the number of the wavelengths is detected by the AGC circuit, and the transmission of the optical signal is delayed such that the time required for controlling the gain of the optical amplifier equals to the time required for inputting the optical signal to the optical amplifier, thus preventing the variation of the optical output power of the optical amplifier. More specifically, as shown in FIG. 21, the optical amplifying apparatus includes a delay portion 121 to delay the transmission of the optical signal on the optical transmission line between the optical coupler 113 at the input side of the optical amplifier 111 and the optical amplifier 111. In the optical amplifying apparatus, the time required for controlling the gain by the AGC circuit 119 is set to be the time required for the transmission of the optical signal, thus avoiding the variation of the optical output power as shown in FIG. 20B.

However, the above mentioned conventional optical amplifying apparatus cause a problem in which an additional space for locating an optical fiber in the delay portion is required, since the delay portion utilizes the optical fiber in order to delay optical signal on the transmission line, thus disturbing the realization of the down sizing of the apparatus.

SUMMARY OF THE INVENTION

An object of the invention is to provide an optical amplifying method, an optical amplifying apparatus and an optical amplified transmission system, in which the space occupied by the optical fiber may be reduced to realize the downsizing of the apparatus, and the control constant of the AGC circuit is adjusted to be an appropriate value even when the optical input power to the optical amplifier abruptly varies under operation, thus enabling high speed optical signal transmission and stable optical amplifier control.

One embodiment of the optical amplifying method comprises an optical amplifying method in which at least one optical amplifier is connected to an optical transmission line, an optical signal transmitted through said optical transmission line is amplified by said optical amplifier while an optical power of the optical signal on the optical transmission line is detected, and gain of the optical amplifier is controlled in response to an optical power of thus detected, the method comprising the steps of:

detecting an optical input and output power of said optical amplifier;
 obtaining a difference between gain of said optical amplifier and target gain on a basis of detected optical input and output power;
 implementing a proportional calculation and an integral calculation of said difference by an automatic constant gain control device to obtain a drive current of at least one pump laser diode provided in said optical amplifier; and
 controlling gain of said optical amplifier by controlling current of said pump laser diode based on a calculated drive current value.

In this embodiment, the difference between the gain obtained from the optical input/output power and the target gain is calculated, the proportional integral control is implemented based on the difference to calculate the current of the pump LD (LD current), and the gain of the optical amplifier is controlled in correspondence to the calculated LD current, thus, the variation of the optical output power per wavelength channel is maintained small so as to suppress the affection to the transmission quality, and in addition, the space occupied by the optical fiber is reduced so as to realize the downsizing of the apparatus.

Other embodiment of the optical amplifying method comprises an optical amplifying method in which at least one optical amplifier and at least one wavelength division-multiplexing device are connected to an optical transmission line, an optical signal transmitted through said optical transmission line is amplified by said optical amplifier while an optical power of the optical signal on the optical transmission line is detected, and gain of the optical amplifier is controlled in response to an optical power of thus detected, the method comprising the steps of:

adding/dropping optical signals of prescribed wavelengths to/from said optical transmission line by said optical division-multiplexing device;

detecting an optical input/output power of said optical amplifier;

obtaining a difference between gain of said optical amplifier and target gain on a basis of detected optical input/output power;

implementing a proportional calculation and an integral calculation of said difference by an automatic constant gain control device to obtain a drive current of at least one pump laser diode provided in said optical amplifier; and controlling gain of said optical amplifier by controlling current of said pump laser diode based on a calculated drive current value.

In this embodiment, the optical input/output power varied according to the add/drop function of the optical signal wavelength number by the wavelength division-multiplexing device such as the OADM (Optical Add-Drop Multiplexer), is monitored, the difference between the gain thus obtained and the target gain is calculated, the proportional integral control is implemented based on the difference to calculate the current of the pump LD (LD current), and the gain of the optical amplifier is controlled in correspondence to the calculated LD current, thus, the variation of the optical output power per one wavelength channel is maintained small so as to suppress the affection to the transmission quality, in addition, the space occupied by the optical fiber is reduced so as to realize the downsizing of the apparatus.

Other embodiment of the optical amplifying method comprises an optical amplifying method further including the steps of detecting an optical input power to said optical amplifier, and adjusting control parameters of said automatic constant gain control device in response to a detected result, wherein a drive current of said pump laser diode is obtained by the automatic constant gain control device with said control parameters adjusted.

In this embodiment, since the optical input/output power of the optical amplifier is monitored, and since the control parameters in the AGC circuit are adjusted in correspondence to the monitored optical input power, the invention enables the optical amplifying apparatus to control transient gain appropriately even when the optical input power to the optical amplifier abruptly varies under operation. Thus, the response time of the control circuit is optimized so as to improve the transient characteristics of the gain control of the optical amplifier and to enable to realize a stable optical transmission.

Other embodiment of the optical amplifying method comprises an optical amplifying method, wherein in said step of adjusting said control parameters, said optical input power from a transmission device on the upper stream or said optical input power varied by input/output of an optical signal of wavelength multiplexing-demultiplexing device in said transmission device on the upper stream is detected, and the control parameters of said automatic constant gain control is adjusted in response to a detected result.

In this embodiment, since the optical input power from the an optical device connected with said optical amplifying apparatus or the optical input power varied by the add/drop function of the optical signal wavelength number by the wavelength division-multiplexing device such as the OADM on the upstream, is monitored to adjust the control parameters of the automatic constant gain control circuit, the invention enables the optical amplifying apparatus to control transient gain appropriately even when the optical input power to the optical amplifier abruptly varies under operation. Thus, the response time of the control circuit is optimized so as to improve the transient characteristics of the gain control of the optical amplifier and to enable to realize a stable optical transmission.

Other embodiment of the optical amplifying method comprises an optical amplifying method, wherein in said step of adjusting said control parameters, proportional constant of a proportional circuit in the automatic constant gain control device as said control parameters is adjusted.

In this embodiment, since the control parameters comprise the proportional constant of the proportional circuit, and the proportional constant of the proportional circuit is adjusted, the response time of the control circuit is optimized so as to improve the transient characteristics of the gain control of the optical amplifier and to enable to realize a stable optical transmission.

One embodiment of the optical amplifying apparatus comprises an optical amplifying apparatus for amplifying an optical signal on an optical transmission line comprising:

at least one optical amplifier amplifying an optical signal transmitted into the optical transmission line;

an optical power detecting device for detecting an optical power of the optical signal on the optical transmission line;

a gain detecting device to detect gain of said optical amplifier;

a difference calculating device to obtain difference between a detected gain and a target gain; and an automatic constant gain control device for implementing a proportional calculation and an integral calculation of said difference to obtain a drive current of at least one pump laser diode provided in said optical amplifier and controlling gain of said optical amplifier to be constant by controlling current of said pump laser diode based on a calculated drive current value.

In this embodiment, the optical input/output power is monitored by the optical power detecting device to detect the gain, the difference between the detected gain and the target gain, and said difference is calculated by AGC device, the proportional integral control is implemented based on the difference by the AGC device to calculate the current of the pump LD (LD current), and the gain of the optical amplifier is controlled in correspondence to the calculated LD current, thus, the space occupied by the optical fiber is reduced so as to realize the downsizing of the apparatus, and the variation of the optical output power per one wavelength channel is maintained small so as to suppress the affection to the transmission quality.

Other embodiment of the optical amplifying apparatus comprises an optical amplifying apparatus for amplifying an optical signal on an optical transmission line comprising:

at least one optical amplifier amplifying an optical signal inputted into the optical transmission line;

an optical power detecting device for detecting an optical power of the optical signal on the optical transmission line;

a wavelength division-multiplexing device for adding/dropping an optical signal of a prescribed wavelength to/from said optical transmission line;

a gain detecting device to detect gain of said optical amplifier;

a difference calculating device to obtain difference between a detected gain and a target gain; and an automatic constant gain control device for implementing a proportional calculation and an integral calculation of said difference to obtain a drive current of at least one pump laser diode provided in said optical amplifier and controlling gain of said optical amplifier to be constant by controlling current of said pump laser diode based on a calculated drive current value.

In this embodiment, the apparatus includes the wavelength division-multiplexing device such as the OADM. Since the optical input/output power varied according to the add/drop function of the optical signal wavelength number by the wavelength division-multiplexing device such as the OADM (Optical Add-Drop Multiplexer), is monitored to calculate the gain, the difference between the calculated gain and the target gain, and since the said difference is calculated by AGC device, and the proportional integral control is implemented based on the difference to calculate the current of the pump LD (LD current), and the gain of the optical amplifier is controlled in correspondence to the calculated LD current, thus, the variation of the optical output power per one wavelength channel is maintained small so as to suppress the affection to the transmission quality, in addition, the space occupied by the optical fiber is reduced so as to realize the downsizing of the apparatus.

Other embodiment of the optical amplifying apparatus comprises an optical amplifying apparatus further comprising an adjusting device for adjusting control parameters of said automatic constant gain control device in response to a detected result of an optical input power to said optical amplifier which is detected by the optical power detecting device, wherein the automatic constant gain control device with said control parameters adjusted controls the gain of the optical amplifier in response to optical input/output power detected by the optical power detecting device.

In this embodiment, since the optical input/output power of the optical amplifier is monitored, and the control parameters in the AGC circuit are adjusted in correspondence to the monitored optical input power, the invention enables the optical amplifying apparatus to control transient gain appropriately even when the optical input power to the optical amplifier abruptly varies under operation. Thus, the response time of the control circuit is optimized so as to improve the transient characteristics of the gain control of the optical amplifier and to enable to realize a stable optical transmission.

Other embodiment of the optical amplifying apparatus comprises an optical amplifying apparatus, wherein said adjusting device adjusts control parameters of said automatic constant gain control device in response to a detected result of said optical input power from an optical device connected with said optical amplifying apparatus detected by said optical power detecting device or said optical input power varied by add/drop function of an optical signal of wavelength division-multiplexing device in said optical device connected with said optical amplifying apparatus.

In this embodiment, since the optical input power from the optical device connected with said optical amplifying apparatus or the optical input power varied by the input signal of a prescribed wavelength by the wavelength division-multiplexing device arranged in the said optical device connected with said optical amplifying apparatus is monitored by means of said detecting device, the invention enables the optical amplifying apparatus to control transient gain appropriately even when the optical input power to the optical amplifier abruptly varies under operation. Thus, the response time of the control circuit is optimized so as to improve the transient characteristics of the gain control of the optical amplifier and to enable to realize a stable optical transmission.

Other embodiment of the optical amplifying apparatus comprises an optical amplifying apparatus, wherein said automatic constant gain control device includes a differential circuit for calculating the difference between the present gain of the optical amplifier and the target gain, a proportional circuit for multiplying proportional constant of the proportional circuit and said difference, and said adjusting device adjusts proportional constant of the proportional circuit as the control parameters.

In this embodiment, since the control parameters to be adjusted comprise the proportional constant of the proportional circuit in the automatic constant gain control device, and since the proportional constant of the proportional circuit is adjusted by the adjusting device, the response time of the control circuit is optimized so as to improve the transient characteristics of the gain control of the optical amplifier and to enable to realize a stable optical transmission.

Other embodiment of the optical amplifying apparatus comprises an optical amplifying apparatus for amplifying an optical signal on an optical transmission line comprising:

at least one optical amplifier for amplifying an optical signal transmitted into the optical transmission line;

an optical power detecting device for detecting an optical power of the optical signal on the optical transmission line;

an automatic constant gain control device for controlling gain of the optical amplifier to be constant; and an adjusting device for adjusting control parameters of the automatic constant gain control device in response to a detected result of an optical output power from said amplifier which is detected by the optical power detecting device.

In this embodiment, since the optical input/output power of the optical amplifier is detected and monitored by means of the optical power detecting device, and since the control parameters are adjusted in correspondence to the optical output power, the invention enables the optical amplifying apparatus to control transient gain appropriately even when the optical input power to the optical amplifier abruptly varies under operation. Thus, the response time of the control circuit is adjusted so as to improve the transient characteristics of the gain control of the optical amplifier and to enable to realize a stable optical transmission.

One embodiment of the optical amplified transmission system comprises an optical amplified transmission system for amplifying an optical signal transmitted to the optical transmission line by a plurality of optical amplifying apparatuses connected in series including at least one optical amplifying apparatus as described in one of the above embodiments.

In this embodiment, since a plurality of the optical amplifying apparatuses in the above embodiment are connected in series on the optical transmission line, the transient characteristics of the gain control of the optical amplifier in the overall optical amplified transmission system is improved to enable to realize a stable transmission of the optical signal.

DETAILED DESCRIPTION

Figure 1:
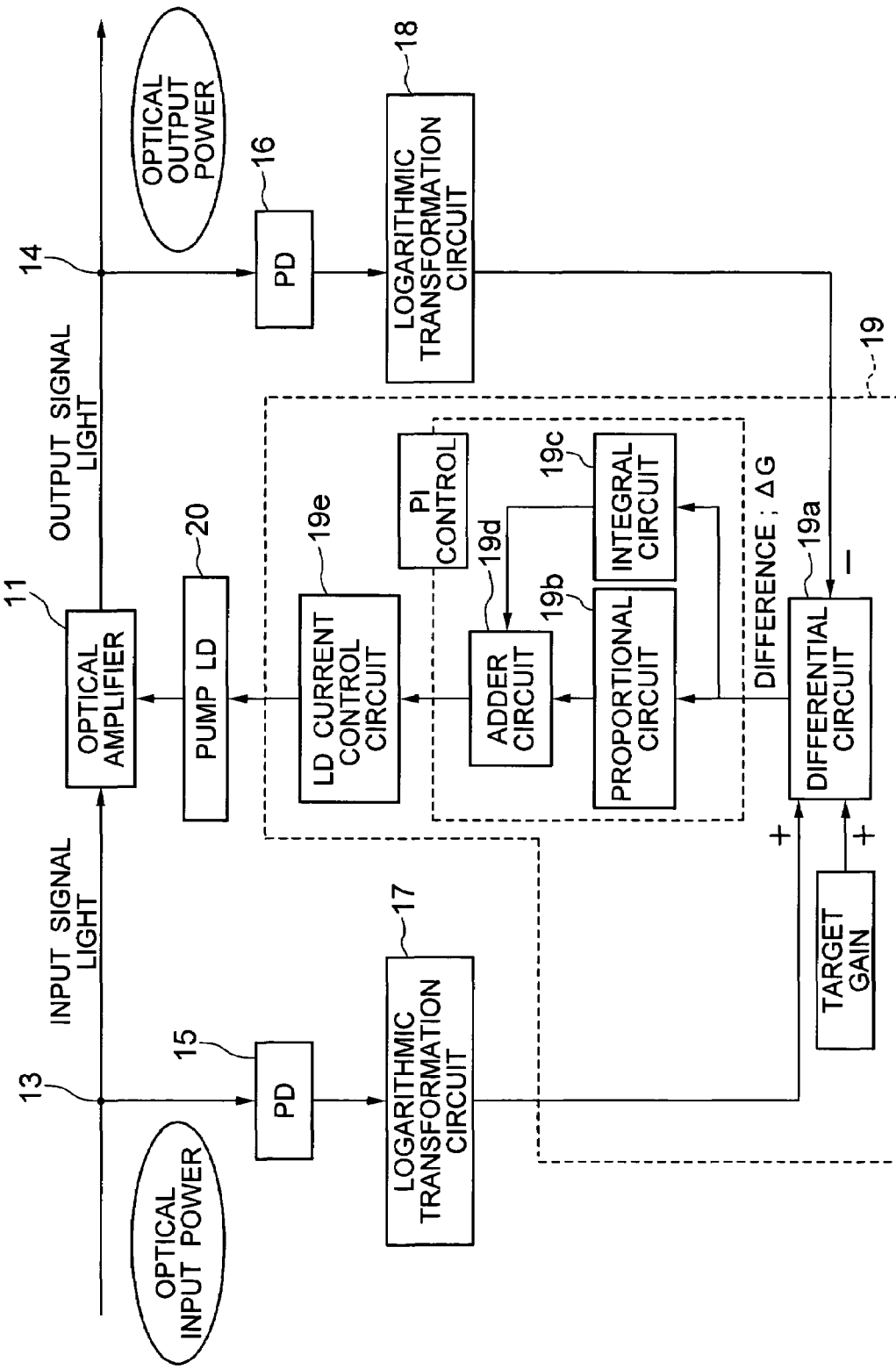
FIG. 1 is a diagram showing the first embodiment of the optical amplifying apparatus of the present invention.

Referring now to the drawings, the embodiments of the optical amplifying method, the optical amplifying apparatus, and the optical amplified transmission system using the apparatus of the present invention will be explained in detail. As various modification of the embodiments of the invention may be made without departing from the spirit and scope thereof, it is to be understood that the invention is not limited to the specific embodiments described hereunder.

(First Embodiment)

FIG. 1 is a diagram showing the first embodiment of the optical amplifying apparatus of the present invention. The automatic constant gain control (AGC) in the optical amplifying apparatus is implemented by a proportional integral control (hereinafter referred to as "PI control"), for example. A control circuit 19 implementing the AGC comprises a differential circuit 19a to which the voltages from logarithmic transformation circuits 17, 18 are inputted, a proportional circuit 19b and an integral circuit 19c to both of which a difference $\Delta G$ from the differential circuit 19a is inputted, an adder circuit 19d to which the output values from the proportional circuit 19b and the integral circuit 19c are inputted, and a laser diode current control circuit 19e to which a calculated value from the adder circuit 19d is inputted.

More specifically, the input/output power of an optical amplifier 11 is converted by a photo diode (PD) 15, 16 and a logarithmic transformation circuit 17, 19 to voltages Vin, Vout corresponding to the respective optical powers, and inputted to the differential circuit 19a. In addition to the voltages Vin and Vout, a voltage G0 corresponding to the target gain set from outside is inputted. The differential circuit 19a calculates the difference $\Delta G$ between the present gain (Vout-Vin) of the optical amplifier 11 and the target gain G0, and outputs the difference $\Delta G$ to the proportional circuit 19b and the integral circuit 19c.

$\Delta G = G0 - (Vout - Vin)$

The proportional circuit 19b outputs a value ($k \cdot \Delta G$) obtained by multiplying the inputted difference $\Delta G$ by the proportional constant k which is pre-set as a fixed value. The integral circuit 19c outputs an integral value $[(1/\tau) \cdot \int \Delta G \, dt]$ of $\Delta G$. Where, $\tau = RC$, R and C are a resistance of the resistor and a capacitance of the capacitor respectively in the integral circuit.

Those output values (k·ΔG) and [(1/τ)·∫ΔG dt] are inputted to the adder circuit 19d. The adder circuit 19d adds those values to calculate a laser diode current value I0.

$$I0 = k \cdot \Delta G + (1/\tau) \cdot \int \Delta G\, dt$$

The adder circuit 19d outputs the calculated value I0 to the LD current control circuit 19e. The LD current control circuit 19e controls a current of a pump LD 20 based on the value I0.

As described above, in the above embodiment of the optical amplifying apparatus, the input/output power of the optical amplifier 11 which is logarithmic-transformed by the PD 15, 16 and the logarithmic transformation circuit 17, 18, and the target gain are inputted to the differential circuit 19a to calculate the difference between the present gain of the optical amplifier and the target gain, and the PI control is implemented such that the difference equals to zero, according to the target gain of the optical amplifier. As a result, it is not necessary to arrange a large space occupied by the optical fiber as in the conventional optical amplifying apparatus, thus realizing the downsizing of the apparatus.

Figure 20:
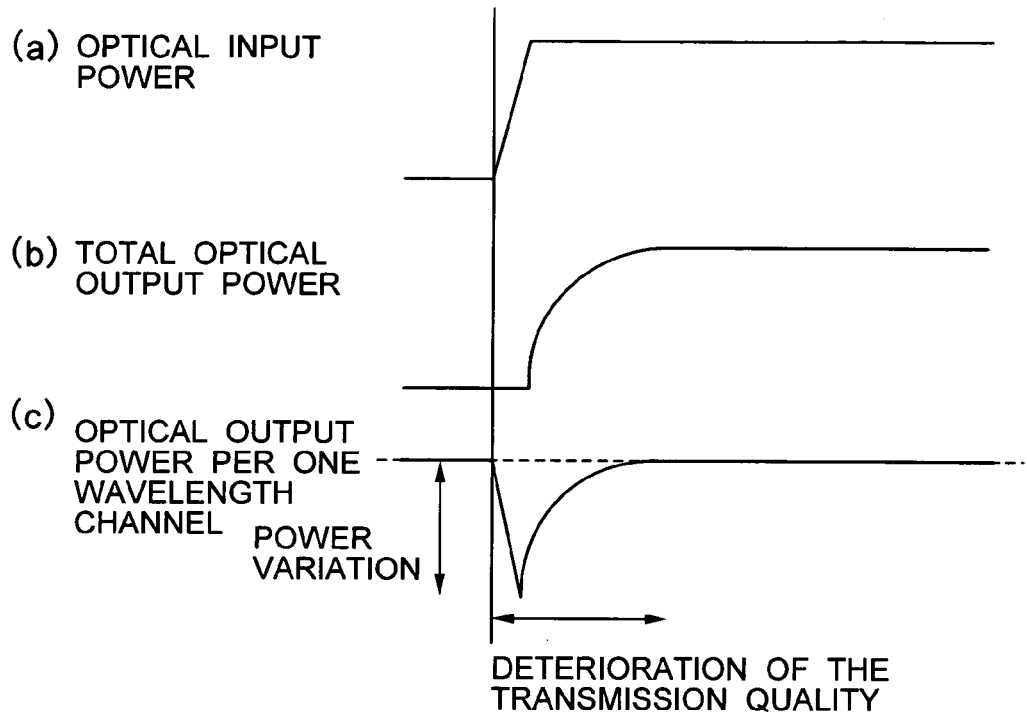
FIG. 20 is a schematic graph showing transient characteristics of the optical power in case that the optical input power varies.
Figure 21:
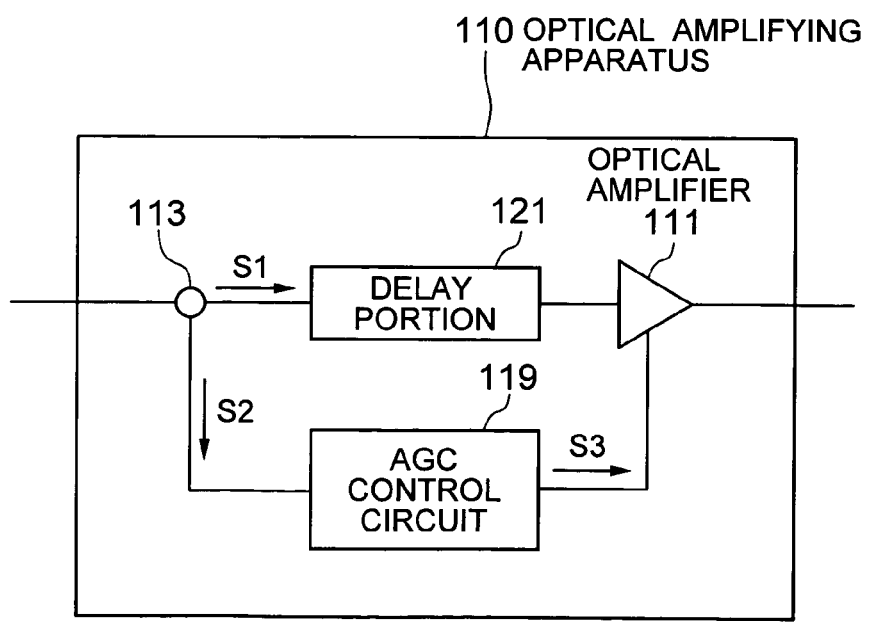
FIG. 21 is a diagram showing other example of the conventional optical amplifying apparatus.

Furthermore, in the above embodiment of the optical amplifying apparatus, as shown in FIG. 20, in order to suppress the variation of the optical output power per one wavelength channel to be small so as to reduce affection to the transmission quality, the proportional constant k of the proportional circuit in the control circuit is set to be somewhat large to adjust the response time of the control circuit, thus improving the transient characteristics of the gain control in the optical amplifier. However, if the proportional constant k is enlarged too much, the optical output from the optical amplifier becomes unstable.

Figure 2:
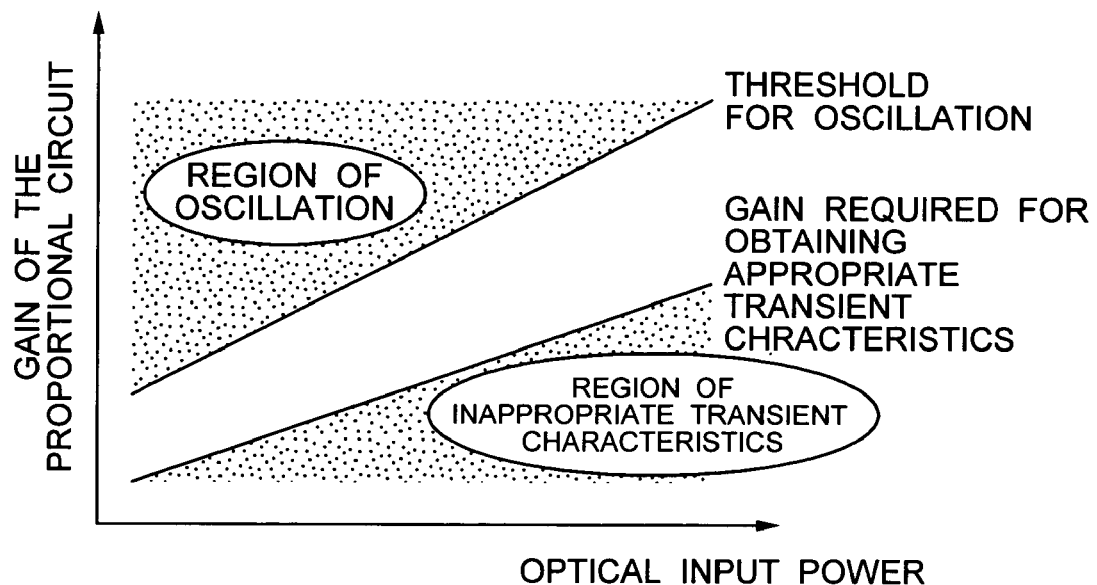
FIG. 2 is a diagram showing a relation between proportional constant in the automatic constant gain control and the optical input power.
Figure 3:
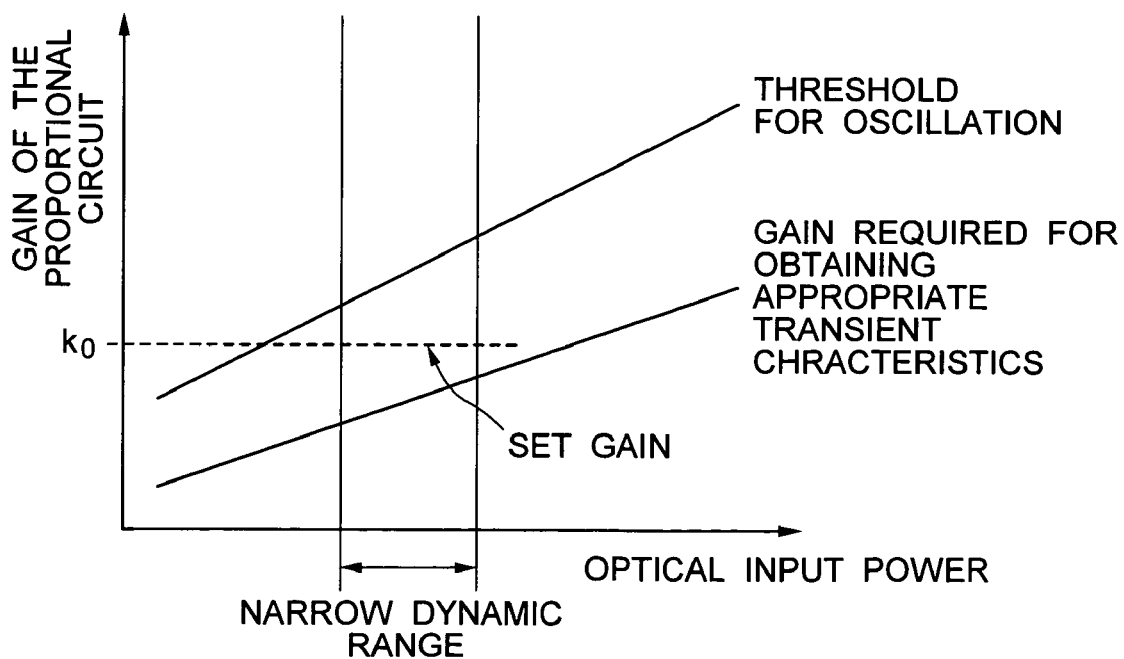
FIG. 3 is a diagram showing a relation between the optical input power and proportional constant in the automatic constant gain control when the optical input dynamic range is narrow.

FIG. 2 is a diagram showing a relation between a proportional constant of the proportional circuit and the optical input power. As illustrated in the drawing, the proportional constant required to obtain the transient characteristics not affecting the transmission quality and the threshold for the proportional constant causing the optical output to be unstable, depends on the optical input power to the optical amplifier under AGC. More specifically, when the optical input power is small, the even small proportional constant can provide appropriate transient characteristics, and the threshold for oscillation becomes small in the case that the input power abruptly varies.

Contrary to the above, when the optical input power becomes large, even though a margin to prevent an unstable operation becomes large, the large proportional constant is required to obtain appropriate transient characteristics In such case, when the dynamic range is relatively narrow, for example, even when the proportional constant of the proportional circuit is set to be constant, (i.e., k=k0), the optical output from the optical amplifier is stable at either upper limit or lower limit of the dynamic range, thus not affecting transient characteristics.

Figure 4:
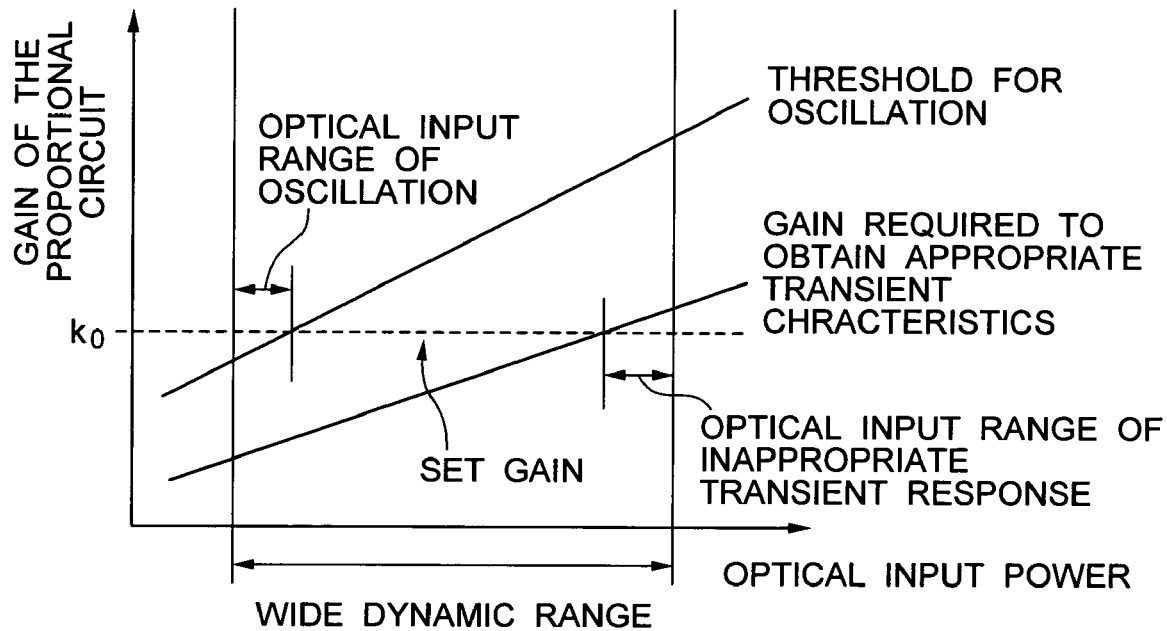
FIG. 4 is a diagram showing a relation between the optical input power and proportional constant in the automatic constant gain control when the optical input dynamic range is wide.

However, when the number of channel wavelengths increases in the WDM transmission system, the optical input/output dynamic range is extended wide, as illustrated in FIG. 4. Accordingly, when the proportional constant of the proportional circuit is maintained constant, the response speed of the control circuit is slow at the vicinity of the upper limit of the dynamic range (i.e., in case that the optical input power is large), thus the said AGC device may not realize appropriate transient gain control characteristics. Furthermore, the proportional constant of the proportional circuit exceeds the threshold for oscillation at the vicinity of the lower limit of the dynamic range, and thus the said AGC device may cause an unstable output power and gain control.

(Second Embodiment)

In the second embodiment of the optical amplifying apparatus of the invention, the apparatus includes a function to adjust the proportional constant of the proportional circuit in the control circuit, thus enabling to adjust the proportional constant of the proportional circuit in correspondence to the optical input power of the optical amplifier. More specifically, according to the second embodiment of the optical amplifying apparatus, the proportional constant of the proportional circuit is adjusted to be large when the optical input power is large, and the proportional constant of the proportional circuit is adjusted to be small when the optical input power is small.

Figure 5:
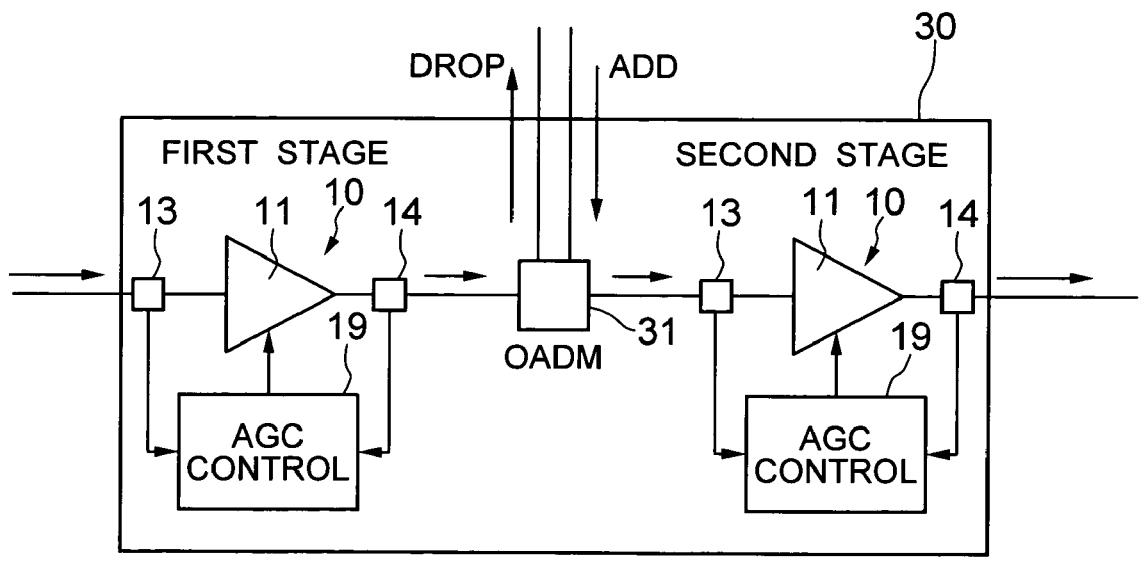
FIG. 5 is a diagram showing the second embodiment of the optical amplifying apparatus of the present invention.

FIG. 5 is a diagram describing the second embodiment of the optical amplifying apparatus of the present invention. The same numeral numbers are used in the following drawing as the elements in FIG. 1.

As shown in FIG. 5, the optical amplifying apparatus of this embodiment comprises the first stage optical amplifying apparatus and the second stage optical amplifying apparatus 10, 10 (which are the same apparatus) connected to the optical transmission line 1, and the optical Add/Drop Multiplexer (OADM) 31 connected between two optical amplifying apparatus 10 and 10 as a wavelength division-multiplexing device. The above mentioned two stages optical amplifying apparatus may be used in the repeater terminal of the WDM transmission system for example.

The OADM 31 drops an optical signal of a specific wavelength from the optical signals transmitted from the first stage optical amplifying apparatus 10, or adds an optical signal of a specific wavelength to the optical signals transmitted from the first stage optical amplifying apparatus 10. Then OADM 31 outputs the multiplexed optical signals to the second stage optical amplifying apparatus 10.

Although the detailed explanation is omitted, since each of the optical amplifying apparatus 10, 10 is the same as the optical amplifying apparatus as shown in FIG. 1, the first stage optical amplifying apparatus 10 monitors the optical input power of the signal transmitted from the upstream repeater terminal to implement the AGC, while the second stage optical amplifying apparatus 10 monitors the optical input power of the signal transmitted from the local OADM 31 to implement the AGC.

Figure 6:
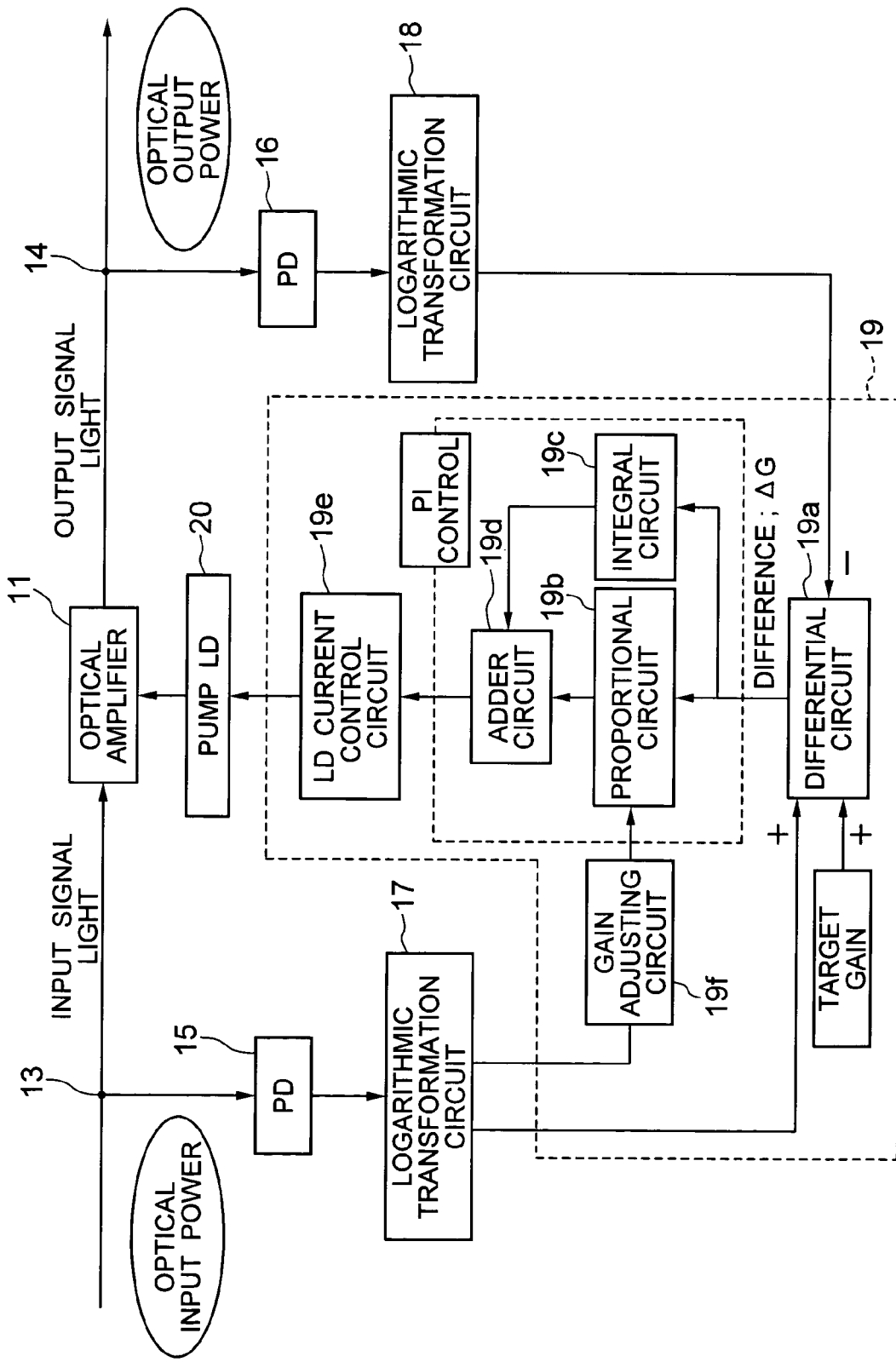
FIG. 6 is a diagram showing an example of the AGC circuit of the two stages-optical amplifying apparatus as shown in FIG. 5.

The AGC circuit 19 of the optical amplifying apparatus 10 as shown in FIG. 5 is different from the AGC circuit as shown in FIG. 1 in that there is provided a proportional constant adjusting circuit 19f in which the proportional constant of the proportional circuit 19b is adjusted in correspondence to the voltage Vin of the optical input power from the logarithmic transformation circuit 17, for example as shown in FIG. 6.

Figure 7:
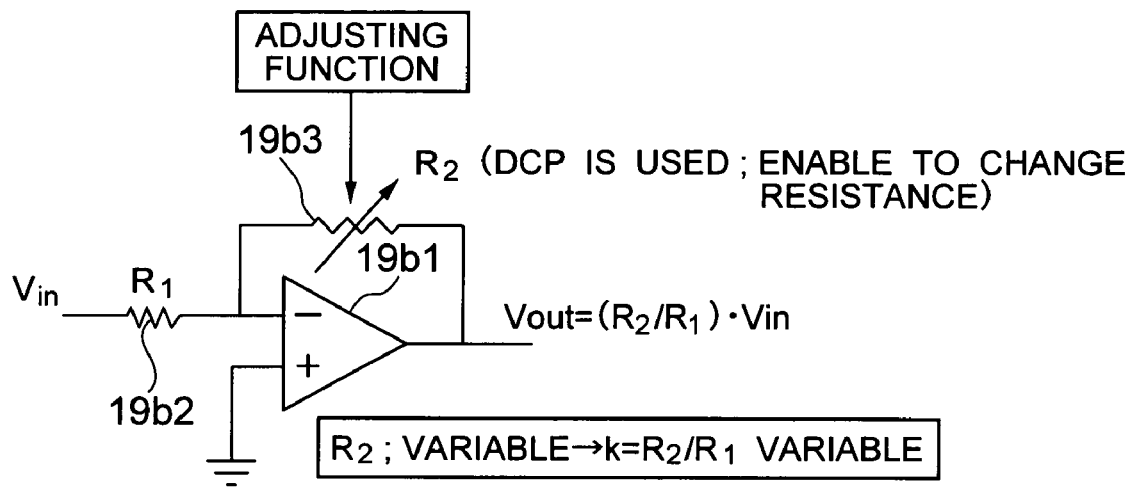
FIG. 7 is a circuit diagram showing a first example of the proportional circuit as shown in FIG. 6.

Furthermore, since the AGC circuit 19 is arranged as described above, the proportional circuit 19b comprises a comparator 19b1, a fixed resistor 19b2 and a variable resistor 19b3 as shown in FIG. 7. As the variable resistor 19b3, a digitally controlled potentiometer (hereinafter referred to as "DCP") is applied, which enables to digitally adjust the proportional constant by a CPU, for example. As a result, the resistance of the variable resistor can be changed by means of the adjusting function of the proportional constant adjusting circuit 19f, even if the apparatus is under the operation.

The proportional constant of the proportional circuit 19b is determined by a ratio of the resistance R1 of the fixed resistor 19b2 to the resistance R2 of the variable resistor 19b3, as follows:

$$k = R2/R1 \tag{1}$$

The proportional constant adjusting circuit 19f monitors the optical input power through the logarithmic transformation circuit 17 from the PD 15, and adjusts the proportional constant of the proportional circuit 19b corresponding to the optical input power Pin. More specifically, the proportional constant adjusting circuit 19f controls the resistance R2 of the variable resistor 19b3 in the proportional circuit 19b so as to be large when the optical input power Pin is large, thus adjusting the proportional constant k to be large. Contrary to the above, the proportional constant adjusting circuit 19f controls the resistance R2 of the variable resistor 19b3 in the proportional circuit 19b so as to be small when the optical input power Pin is small, thus adjusting the proportional constant k to be small.

Figure 8:
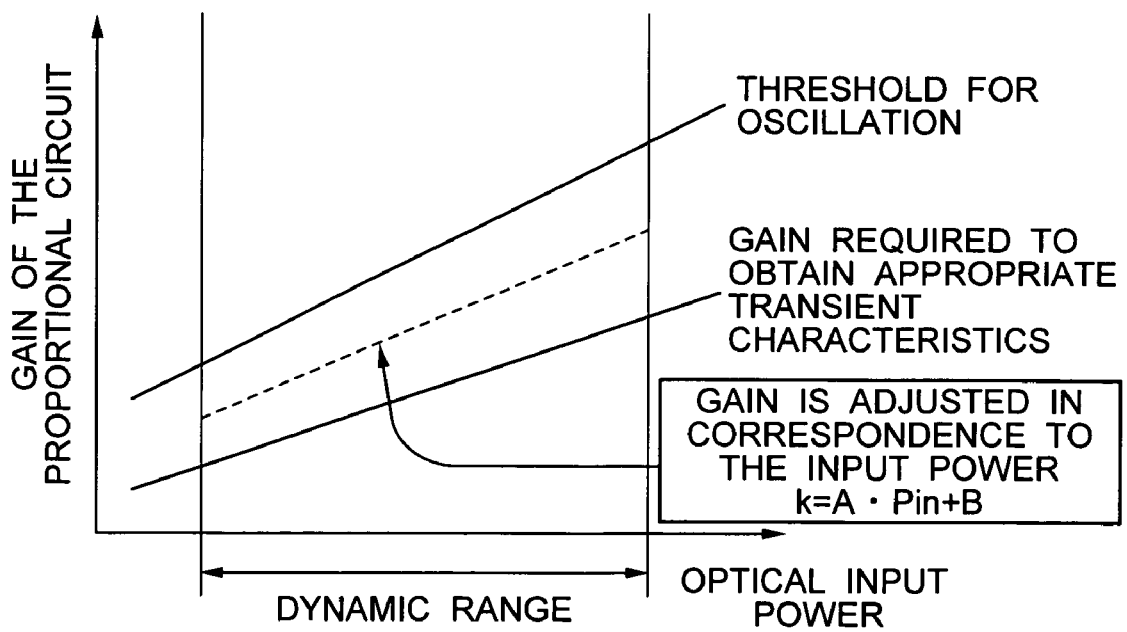
FIG. 8 is a diagram showing a relation between an optical power and the proportional constant adjusted by the proportional constant adjusting circuit as shown in FIG. 7.

For example, the proportional constant adjusting circuit 19f, as shown in FIG. 8, adjusts the proportional constant k of the proportional circuit 19b to be as follows:

$$K = A \cdot Pin + B \tag{2}$$

Where, Pin is the optical input power, and the voltage Vin in correspondence to the optical input power Pin is provided for the proportional constant adjusting circuit 19f by way of the logarithmic transformation circuit 17. And A and B are constant, and are uniquely determined by a desirable proportional constant value k of the proportional circuit and two optical input power values at least.

Figure 9:
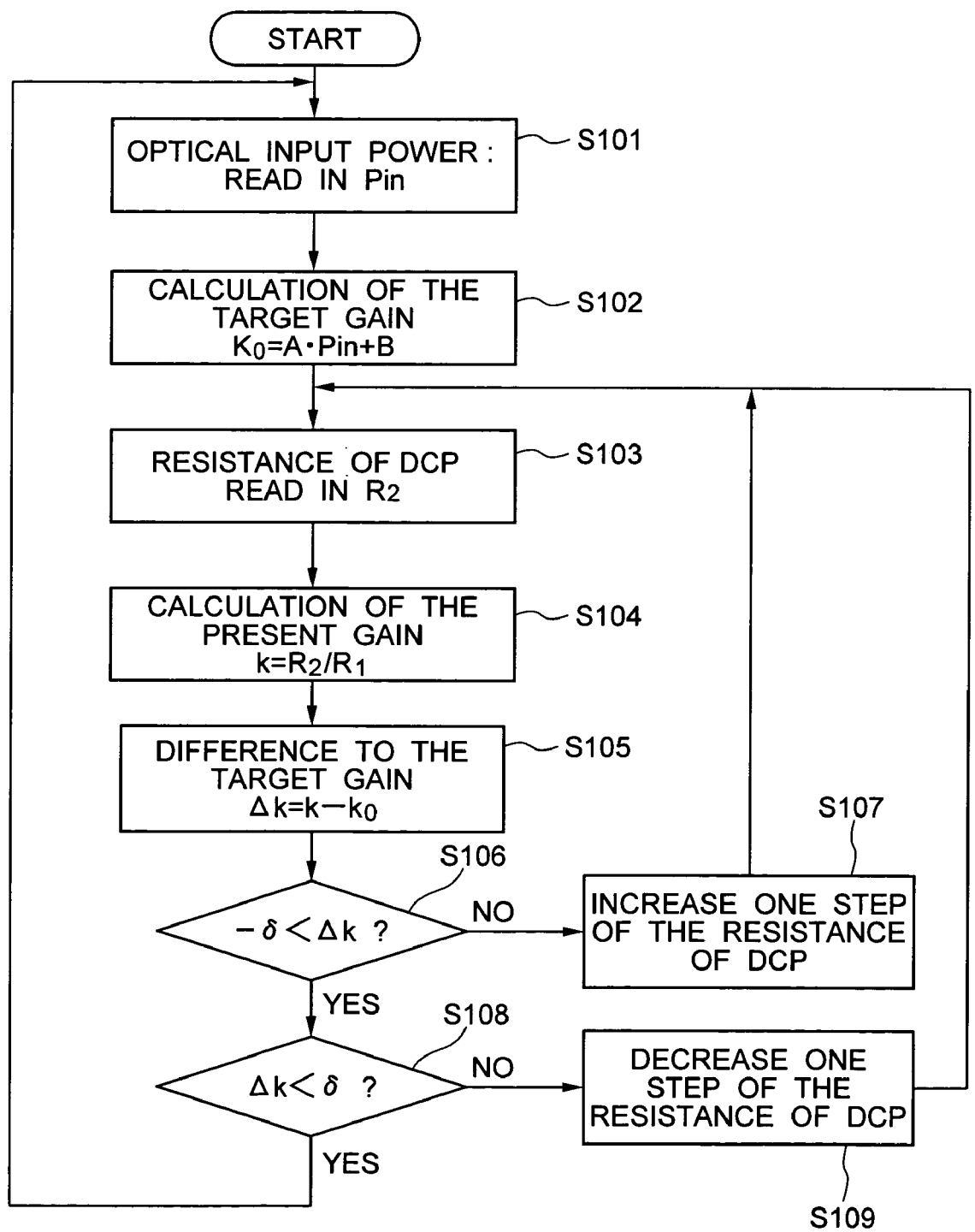
FIG. 9 is a flow chart explaining an adjusting operation of the proportional constant of the optical amplifying apparatus of the present invention.

An adjusting operation of the proportional constant of the proportional circuit in the optical amplifying apparatus 10 is explained with reference to the flow chart as shown in FIG. 9. Where, the proportional constant of the proportional circuit 19b is to be controlled to a target value±δ(δ is an arbitrary number). As shown in the figure, the optical input power Pin is inputted from the PD 15 through the logarithmic transformation circuit 17 to the AGC circuit 19 (Step 101).

The gain adjusting circuit 19f calculates the target proportional constant k0 based on the inputted optical input power Pin in the AGC circuit 19 (Step 102). The above mentioned calculation is executed by substituting the value of the optical input power Pin for the above equation (2). Then, the resistance R2 of the DCP (i.e., the resistance of the variable resistor 19b3 as shown in FIG. 7) is inputted from the proportional circuit 19b to the gain adjusting circuit 19f (Step 103), and the present proportional constant k is calculated by applying the above equation (1) (Step 104).

The proportional constant adjusting circuit 19f obtains the difference Δk by the calculated target proportional constant k0 in the Steps 102 and 104 and the present proportional constant k, applying the following: Δk=k−k0 (Step 105), and then determines whether Δk is larger than −δ or not (Step 106).

When −δ≧Δk, it is determined that the proportional constant is out of the range of the target value±δ, and the resistance R2 of the DCP is controlled to increase one step (Step 107). When −δ<Δk, it is to be determined whether Δk is smaller than +δ (Step 108).

Here, the proportional constant adjusting circuit 19f determines that the proportional constant is out of the range of the target value±δ, when Δk≧+δ, and controls the resistance R2 of the DCP so as to reduce one step (Step 109). The proportional constant adjusting circuit 19f determines that the gain is within the range of the target value±δ, when Δk<δ, and returns to the Step 101 without controlling the DCP to execute an adjusting operation of the proportional constant in relation to the next monitored optical input power Pin.

As described above, in this embodiment of the apparatus, since the proportional constant adjusting circuit to adjust the proportional constant of the proportional circuit is provided in the AGC circuit to continuously adjust the proportional constant in correspondence to the optical input power. Thus the proportional constant of the proportional circuit is changed to be the small value in the vicinity of the lower limit of the dynamic range, therefore preventing the optical amplifier from unstable output power operation.

Furthermore, the proportional constant of the proportional circuit is changed to be the large value in the vicinity of the upper limit of the dynamic range where the margin for the oscillation of the control circuit is large, thus enabling the response speed of the control circuit to be fast so that the transient characteristics of the gain control of the optical amplifier is improved to reduce the deterioration of the transmission characteristics of the optical signal when the optical power abruptly varies.

(Third Embodiment)

It is proposed in the second embodiment of the apparatus that the gain is continuously adjusted by applying DCP. However, the present invention is not limited thereto, and the invention can adjust the gain of the proportional circuit by applying analog switches.

Figure 10:
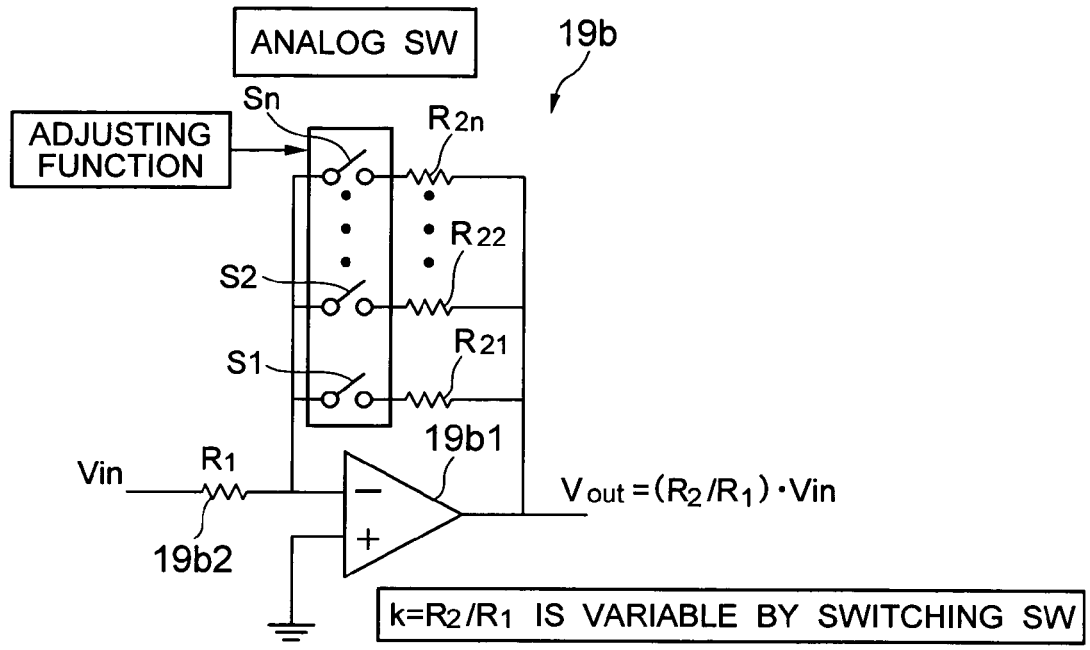
FIG. 10 is a circuit diagram showing a second example of the proportional circuit as shown in FIG. 6.

FIG. 10 is a circuit diagram showing a second example of the proportional circuit as shown in FIG. 6. As shown in FIG. 10, in the proportional circuit 19b, a plurality of resistors R21 to R2n (n is an arbitrary integer number) having different resistances in place of the DCP are connected in parallel, and each of the analog switches S1 to Sn is connected in series to the respective corresponding resistors R21 to R2n.

The gain adjusting circuit 19f controls to switch the analog switches S1 to Sn in response to the monitored optical input power so that the resistances of the resistors R21 to R2n (n is an arbitrary integer number) connected to the comparator 19b1 are changed, thus enabling to adjust the proportional constant of the proportional circuit.

Figure 11:
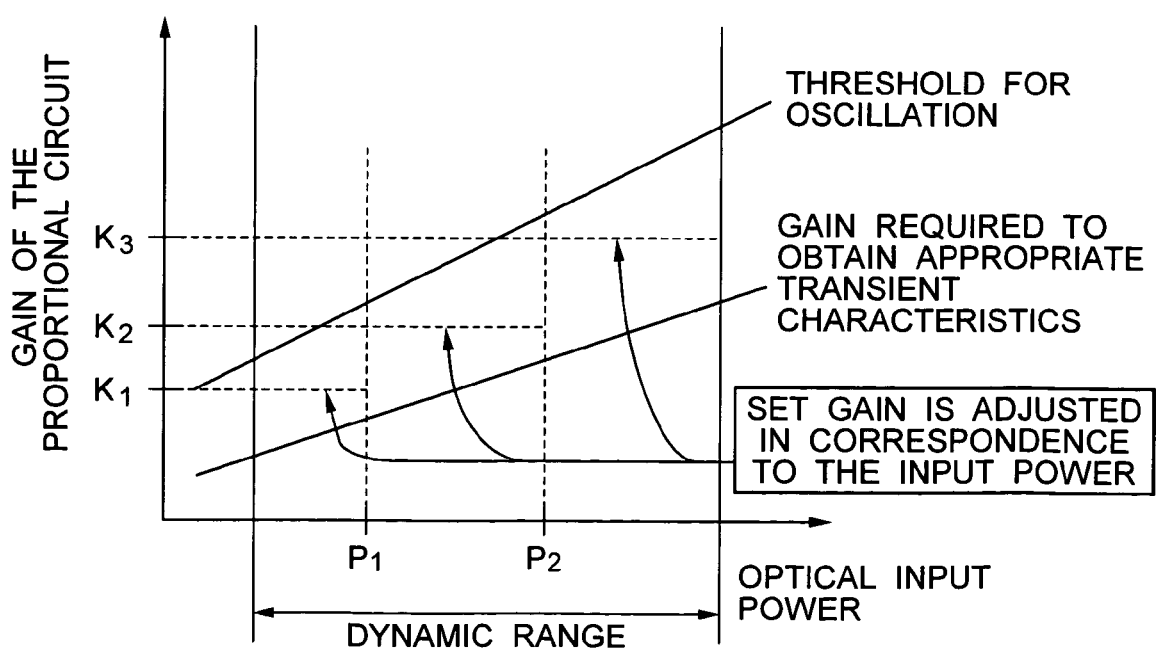
FIG. 11 is a diagram showing a relation between an optical power and the proportional constant adjusted by the proportional constant adjusting circuit as shown in FIG. 10.

For example, as shown in FIG. 11, the proportional constant is set to select one of three stages k1, k2, k3 in the proportional constant adjusting circuit 19f where it satisfies k1<k2<k3. The proportional constant adjusting circuit 19f controls to switch to a resistor having a small resistance within the resistors R21 to R2n in the proportional circuit 19b when the monitored optical input power Pin is smaller than P1, thus adjusting the proportional constant to be small proportional constant k1.

The proportional constant adjusting circuit 19f controls to switch to a resistor having a medium resistance within the resistors R21 to R2n in the proportional circuit 19b when the monitored optical input power Pin is within the range from P1 to P2, thus adjusting the proportional constant to be medium proportional constant k2. The proportional constant adjusting circuit 19f controls to switch to a resistor producing a larger resistance within the resistors R21 to R2n in the proportional circuit 19b when the monitored optical input power Pin is larger than P2, thus adjusting the proportional constant to be large proportional constant k3.

An adjusting operation of the proportional constant of the proportional circuit in the optical amplifying apparatus 10 including the proportional constant adjusting circuit 19f is explained with reference to the flow chart as shown in FIG.

Figure 12:
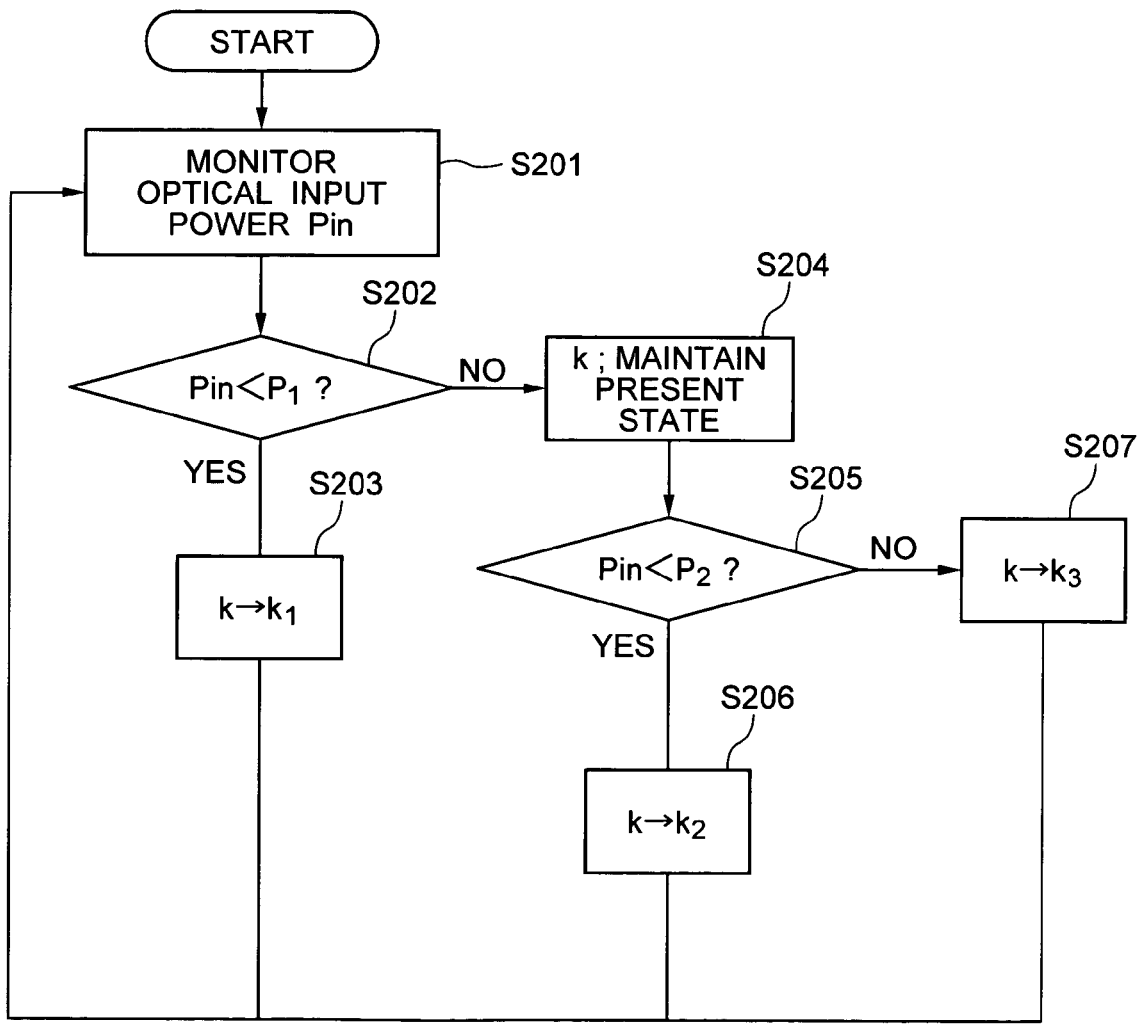
FIG. 12 is a flow chart explaining an adjusting operation of the proportional constant of the optical amplifying apparatus of the present invention including a proportional constant adjusting circuit as shown in FIG. 11.

12. As shown in FIG. 12, the AGC circuit 19 reads in the optical input power Pin from the PD 15 through the logarithmic transformation circuit 17 (Step 201). The proportional constant adjusting circuit 19f in the AGC circuit 19 determines whether the read optical input power Pin is smaller than P1 (i.e., Pin<P1) or not (Step 202).

Here, the proportional constant adjusting circuit 19f controls to switch to a resistor producing a small resistance within the resistors R21 to R2n in the proportional circuit 19b when Pin<P1, thus adjusting the proportional constant k to be proportional constant k1 (Step 203). When Pin>=P1, the proportional constant k is maintained to be the present state (Step 204), and then, the gain adjusting circuit 19f determines whether being Pin<P2 or not (Step 205).

The proportional constant adjusting circuit 19f controls to switch to a resistor producing a medium resistance within the resistors R21 to R2n in the proportional circuit 19b when Pin<P2, thus adjusting the proportional constant k to be proportional constant k2 (Step 206).

Furthermore, the proportional constant adjusting circuit 19f controls to switch to a resistor producing a large resistance within the resistors R21 to R2n in the proportional circuit 19b when Pin≧P2, thus adjusting the proportional constant k to be large proportional constant k3 (Step 207).

As described above, in this embodiment of the apparatus, since the proportional constant adjusting circuit to adjust the proportional constant of the proportional circuit is provided in the AGC circuit to intermittently adjust the proportional constant in response to the optical input power, the proportional constant of the proportional circuit is changed to be the small value in the vicinity of the lower limit of the dynamic range, thus preventing the optical amplifier from unstable output power operation, as same as in the second embodiment.

Furthermore, the proportional constant of the proportional circuit is changed to be the large value in the vicinity of the upper limit of the dynamic range where the margin for the oscillation of the control circuit is large, thus enabling the response time of the control circuit to be fast so that the transient characteristics of the gain control of the optical amplifier is improved to reduce the deterioration of the transmission characteristics of the optical signal when the optical power abruptly varies.

The effect of the present invention is verified according to the measured comparative results of the third embodiment of the apparatus and the apparatus in which the proportional constant of the proportional circuit is fixed. The optical amplifying apparatus comprising the first stage optical amplifying apparatus and the second stage optical amplifying apparatus as shown in FIG. 5 is used for measuring the effect, in which the first stage optical amplifying apparatus and the second stage optical amplifying apparatus implement the independent AGC, respectively.

The first stage optical amplifying apparatus is connected to the second optical amplifying apparatus by an attenuator in place of the OADM. As the optical signal, four wavelength channels of the surviving signal and twelve wavelength channels of the excursion signal within the wavelength band from 1530.33 [nm] to 1561.42 [nm] are used, and the optical input to the first stage optical amplifying apparatus is increased from four wavelength to sixteen wavelength by means of switching on/off the excursion signal, thus changing the total optical input power to four times (i.e., 6 [dB] increases).

Furthermore, the optical power per one wavelength channel is set to be −12 [dBm/ch] and −24 [dBm/ch], and the total optical input power is measured in two cases (i.e., one case in which the optical input power is varied in the vicinity of the upper limit of the dynamic range (i.e., changed from −6 [dBm] to 0 [dBm]), and the other case in which the optical input power is varied in the vicinity of the lower limit of the dynamic range (i.e., changed from −18 [dBm] to −12 [dBm])). The transient response of the optical output power per one wavelength channel in the 1530.33 [nm] is measured in the optical output from the second stage optical amplifying apparatus when the optical input power varies.

Figure 13:
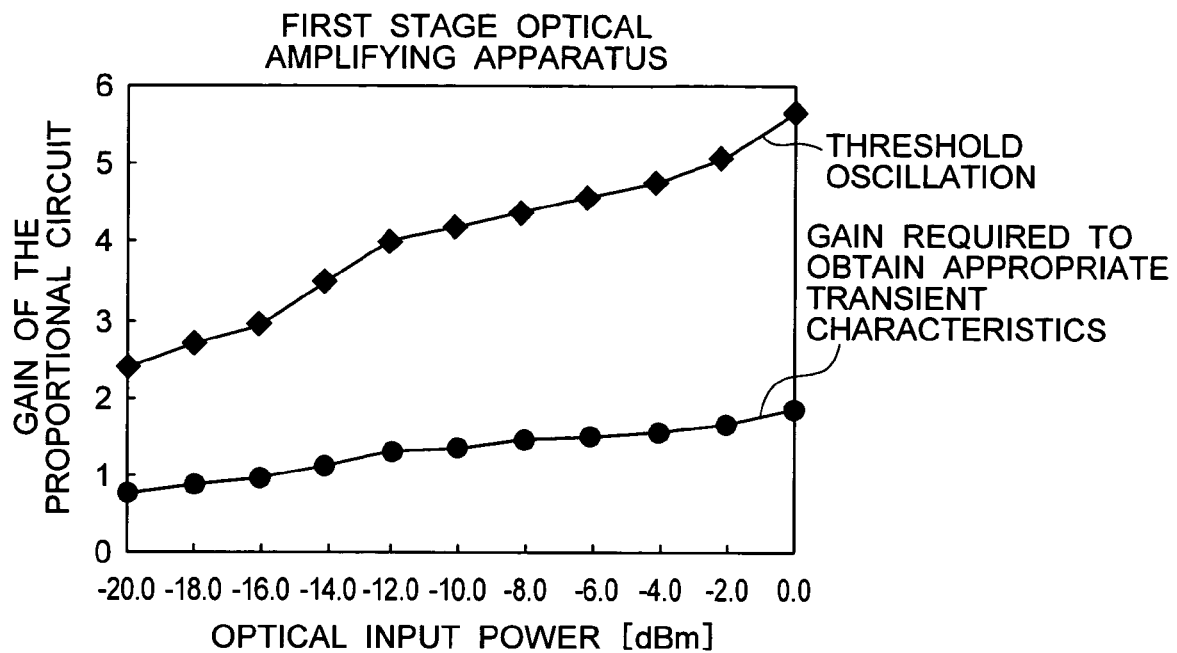
FIG. 13 is a diagram showing a relation between an optical input power and the proportional constant in the first stage AGC circuit as shown in FIG. 5.
Figure 14:
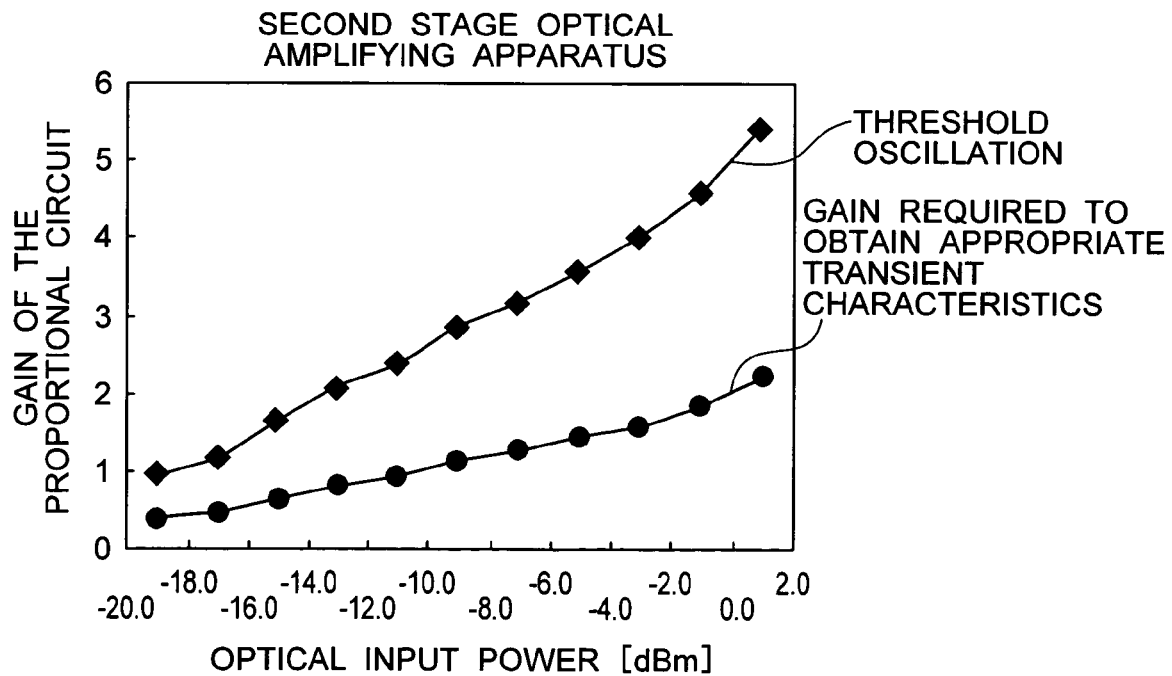
FIG. 14 is a diagram showing a relation between an optical input power and the proportional constant in the second stage AGC circuit as shown in FIG. 5.

The relation between the proportional constant of the proportional circuit and the optical input power in the two stage-optical amplifying apparatus is as shown in FIGS. 13 and 14. FIG. 13 shows the relation between the proportional constant and the optical input power in the first stage optical amplifying apparatus. FIG. 14 shows the relation between the proportional constant and the optical input power in the second stage optical amplifying apparatus.

Figure 15:
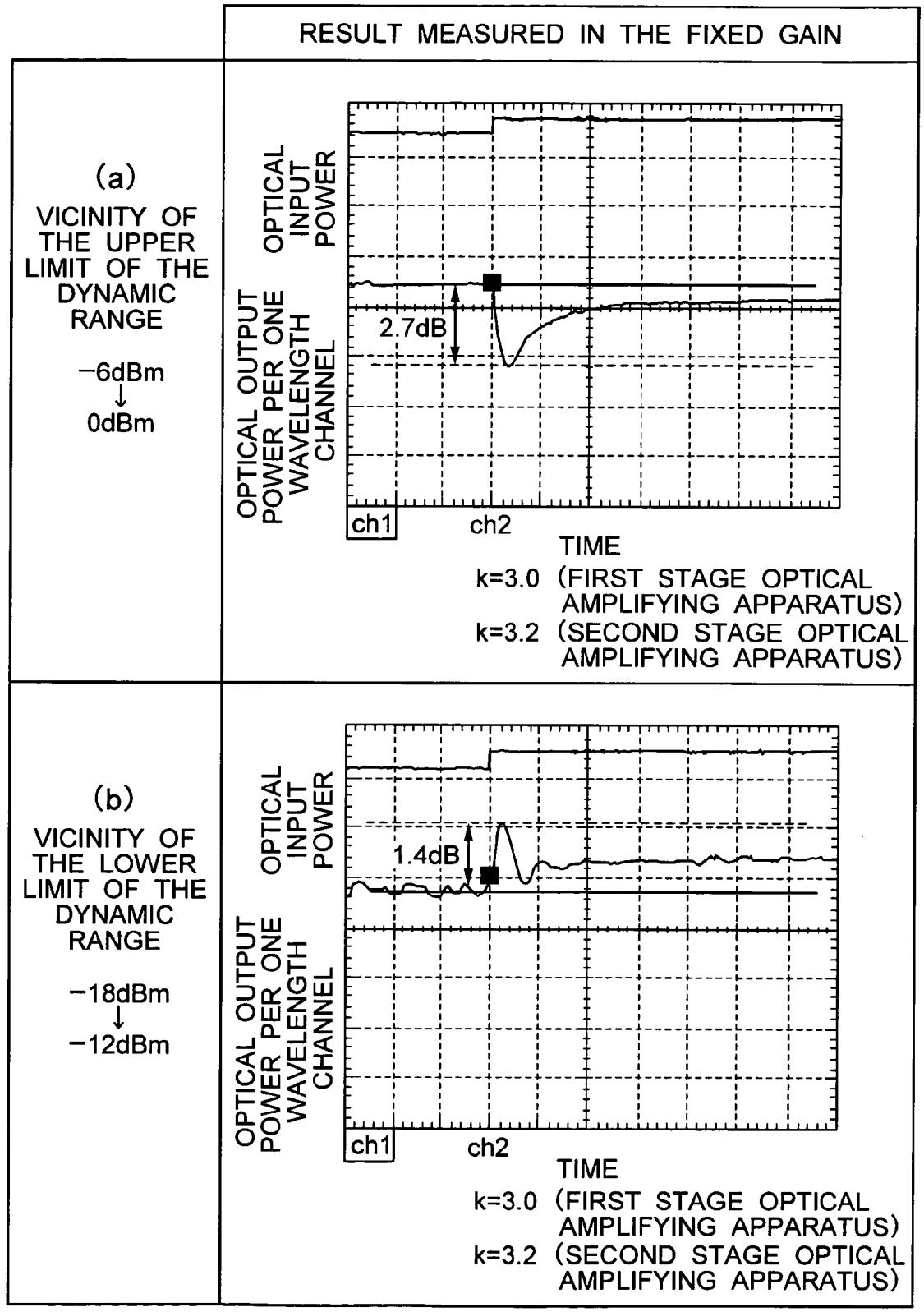
FIG. 15 is a waveform diagram showing a measuring result of a transient characteristics of the optical power in case that the optical input power varies when the proportional constant is fixed in the automatic constant gain control.

For comparison, the optical power is measured in the conventional apparatus with the proportional constant fixed in which the proportional constant k of the first stage optical amplifying apparatus is fixed to be 3.0, and the proportional constant k of the second stage optical amplifying apparatus is fixed to be 3.2 in either cases when the optical input power is high (refer to FIG. 15-A), or when the optical input power is low (refer to FIG. 15-B).

Figure 16:
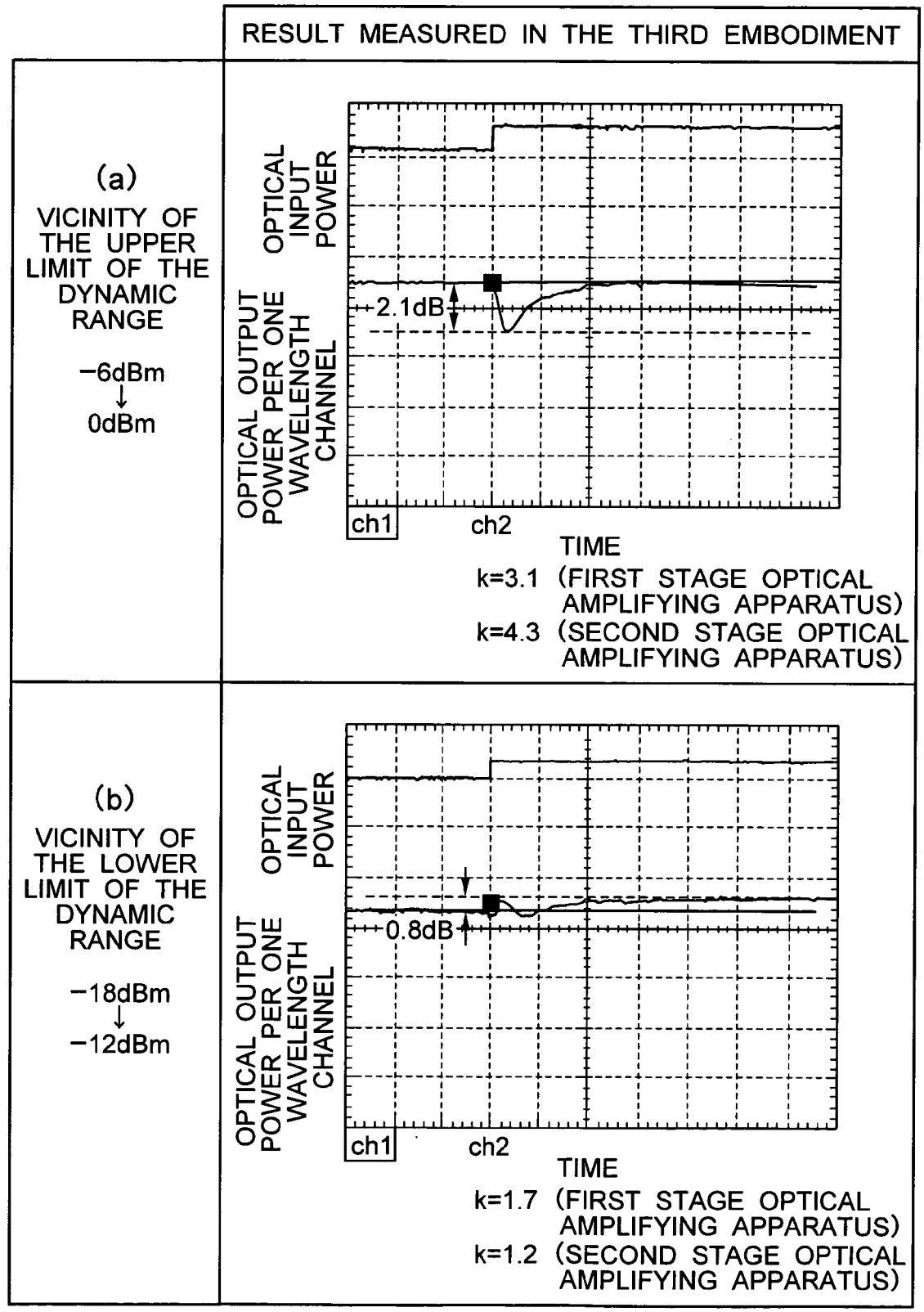
FIG. 16 is a waveform diagram showing a measuring result of transient characteristics of the optical power in case that the optical input power varies when the third embodiment is applied.

The optical power is measured in the apparatus of the third embodiment of the invention with the proportional constant adjusted in which the proportional constant k of the first stage optical amplifying apparatus is set to be 3.1 and the proportional constant k of the second stage optical amplifying apparatus is set to be 4.3 when the optical input power is high (refer to FIG. 16-A), while the proportional constant k of the first stage optical amplifying apparatus is set to be 1.7 and the proportional constant k of the second stage optical amplifying apparatus is set to be 1.2 when the optical input power is low (refer to FIG. 16-B).

The result shows that when the proportional constant is fixed as in the conventional apparatus, the optical output power per one wavelength channel largely varies to the corresponding variation of the optical input power shown in the case that the optical input power is large in FIG. 15-A, thus deteriorating the transmission quality of the optical signal when the optical input power varies. Furthermore, the optical output power per one wavelength channel becomes unstable to the corresponding variation of the optical input power shown in the case that the optical input power is small in FIG. 15-B.

Contrary to the above, when the proportional constant is adjusted as in the apparatus of the third embodiment of the invention, the optical output power per one wavelength channel varies small to the corresponding variation of the optical input power shown in the case that the optical input power is large in FIG. 16-A, since the proportional constant is set to be large, thus the transient output power characteristics becomes superior so as to improve the transmission quality of the optical signal when the optical input power varies.

Furthermore, the optical output power per one wavelength channel becomes stable to the corresponding variation of the optical input power shown in the case that the optical input power is small in FIG. 16-B, since the proportional constant is set to be small.

As is clear from the measured results, when the corresponding proportional constant is set and adjusted in response to the variation of the optical input power to the optical amplifier even under operation, the response time of the control circuit is adjusted to improve the transient characteristics of the gain control of the optical amplifier, thus enabling to realize a stable optical transmission.

(Fourth Embodiment)

Figure 17:
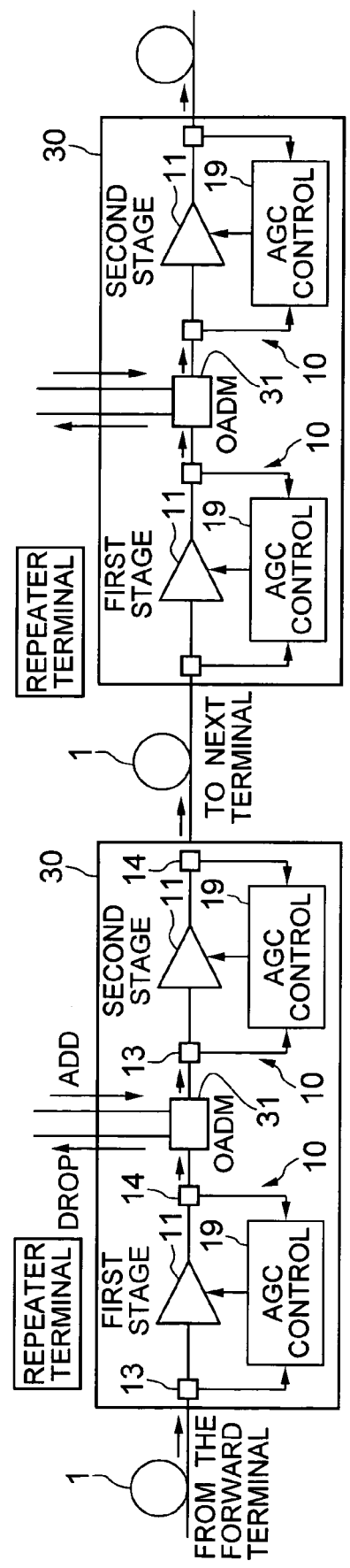
FIG. 17 is a partial system diagram of the optical amplified transmission system using the optical amplifying apparatus as shown in FIG. 5.

FIG. 17 is a partial system diagram of the optical amplified transmission system comprising multiple stages (connected in series) of the optical amplifying apparatuses of the first embodiment as shown in FIG. 5. The optical amplifying apparatus 30 functions as a repeater terminal. In the repeater terminal 30, OADM 31 adds a part of the optical signal transmitted from the upstream terminal (forward repeater terminal), or drops new wavelength channels to optical signal transmitted from the upstream terminal.

In case that the number of the wavelengths of the optical signal multiplexed by the OADM 31, are twice increased, the optical power in the second stage optical amplifying apparatus 10 is increased to two times of the original optical input power. For example, the optical input power corresponding to six wavelength channels are increased to the optical input power corresponding to twelve wavelength channels.

However the automatic constant gain control can maintain the optical power per one wavelength channel to be constant in the repeater terminal of this embodiment, since the proportional constant of the proportional circuit in the AGC circuit 19 is adjusted in response to the optical input power of the optical amplifier.

So that the response of the optical amplifier in this embodiment remains the same in spite of various optical input power to the amplifier. Thus the gain of the optical amplifier 11 is controlled independently of the number of the input wavelength channels.

Furthermore, in this embodiment of the repeater terminal, since the proportional constant of the proportional circuit is adjusted independently in each repeater terminal, the proportional constant of the proportional circuit is changed to be the small value in the vicinity of the lower limit of the dynamic range, thus preventing the optical amplifier from unstable output power operation.

Furthermore, the proportional constant of the proportional circuit is changed to be the large value in the vicinity of the upper limit of the dynamic range where the margin for the oscillation of the control circuit is large, thus enabling the response speed of the control circuit to be fast so that the transient characteristics of the gain control of the optical amplifier is improved to reduce the deterioration of the transmission characteristics of the optical signal when the optical power abruptly varies. As a result, accumulated optical power variation of the optical signal in multiple repeater terminals in series can be effectively suppressed, thus enabling to realize a stable transmission of the optical signal.

(Fifth Embodiment)

Figure 19:
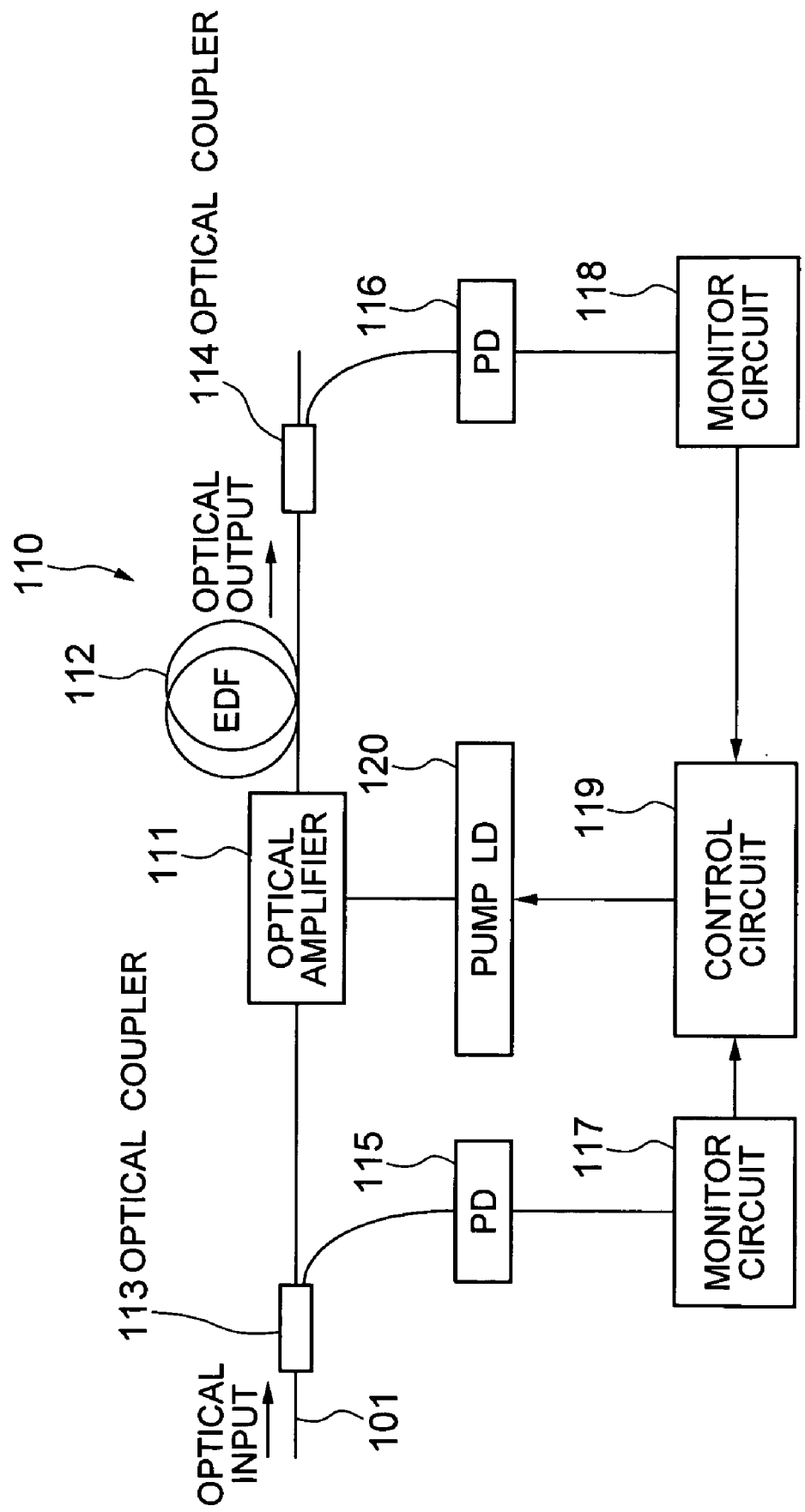
FIG. 19 is a diagram showing an example of the conventional optical amplifying apparatus.

In the optical amplifying apparatus applying a traditional automatic constant gain control as shown in FIG. 19, a PID control may be implemented, i.e., a proportional integral derivative constant (hereinafter referred to as "PID") may be optimized to the specific output power.

In the above mentioned optical amplifying apparatus applying a traditional automatic constant gain control, when the PID constant is optimized in the operational condition of the small optical output, the control response of the pump laser diode 20 is optimized under the operational condition of slow response speed of EDF 12.

Accordingly, when the optical input power abruptly varies in the operational condition of the large optical output, the gain control cannot effectively follow the gain variation of the EDF 12, since the control response of the pump LD 20 is slower than the gain variation of the EDF 12, thus the optical output power per one wavelength channel largely varies.

On the other hand, when the PID constant is optimized in the operational condition of the large optical output, the control response of the pump laser diode 20 is optimized under the operational condition of quick response of EDF 12. Accordingly, when the optical input power varies in the operational condition of the small optical output, it is highly possible that the optical output power becomes unstable, since the control response of the pump LD 20 is faster than the gain variation of the EDF 12, thus the gain control becomes faster than the gain variation time of the EDF. As a result, gain of the optical amplifier fluctuates against input power variation, and the optical output power per one wavelength channel largely varies.

In the above mentioned optical amplifying apparatus applying a traditional automatic constant gain control, when the optical output power range is narrow under the operation, the gain control is stable in either the upper limit or the lower limit of the optical output power and the response characteristics of automatic constant gain control does not cause serious unstable operation under the transitional period of optical input power variation, even if the control response of the pump LD 12 is maintained constant against operating condition.

However, when the optical amplifying apparatus utilizing the said traditional AGC is applied to the WDM transmission which transmits a large number of wavelength channels, the range of the optical output power of the optical amplifying apparatus is assumed to be large since the output power corresponds to the increase/decrease of the channel number.

In case that the control constants are fixed under the AGC of optical amplifier, the said traditional AGC cannot achieve a stable and fast constant gain control, since the optical output power largely varies in response to the variation of the optical input power in accordance with the increase/decrease of the wavelength channel number.

Figure 18:
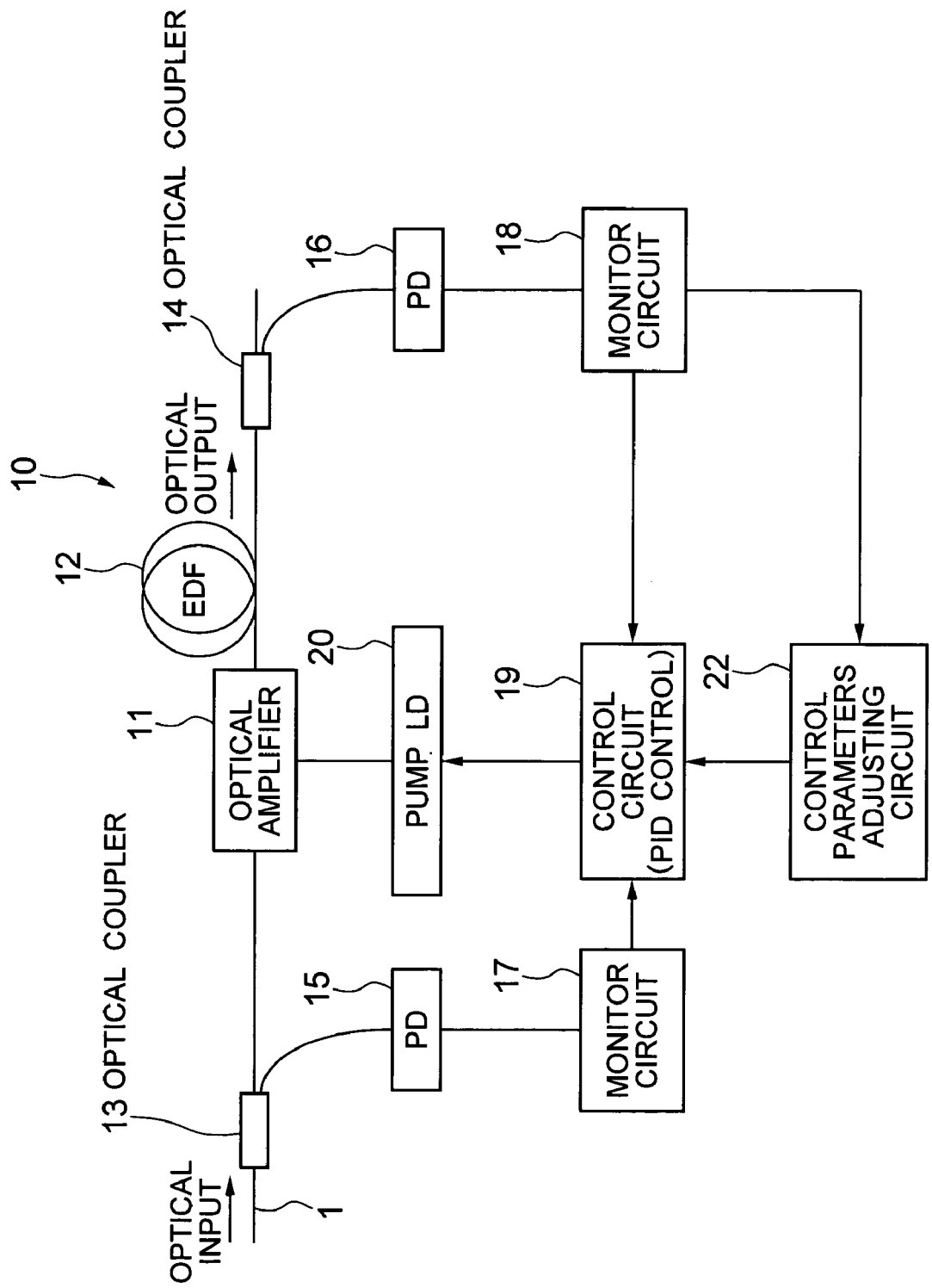
FIG. 18 is a diagram showing the fifth embodiment of the optical amplifying apparatus of the present invention.

In order to solve the above problem, the optical amplifying apparatus of the invention, as shown in FIG. 18, includes a control parameters adjusting circuit 22 to adjust the control parameters of the control circuit 19 implementing the PID control of the pump LD 20 in correspondence to the optical output power monitored in the monitor circuit 18. Furthermore, the control parameters are adjusted in correspondence to the optical output power, the invention enables the optical amplifying apparatus to control transient gain appropriately even when the optical output power to the optical amplifier abruptly varies under operation. Thus, the response time of the control circuit is optimized so as to improve the transient characteristics of the gain control of the optical amplifier and to enable to suppress a deterioration of optical transmission characteristics in the case of transient optical input power variation to the optical amplifier.

The optical amplifying apparatus of this embodiment includes a function to adjust each of the control parameters, i.e., the proportional constant, the integral constant, and the derivative constant of the control circuit 19 implementing the AGC. When the optical output power is small, the control parameters are adjusted so as to slow down the response speed of the control circuit, thus preventing the optical amplifier 11 in the optical amplifying apparatus from unstable output power operation.

When the optical output power is large, the control parameters are adjusted so as to quicken the response speed of the control circuit, thus improving the transient characteristics of the gain control in the optical amplifier under the condition of transient optical input power variation to the optical amplifier. As a result, the invention can suppress the deterioration of the transmission characteristics in the case of transient optical input power variation to the optical amplifier. More specifically, it is realized by this embodiment that the optical amplifying apparatus provides the most optimal response characteristics independent of the variation of the wavelength channel number.

Figure 22:
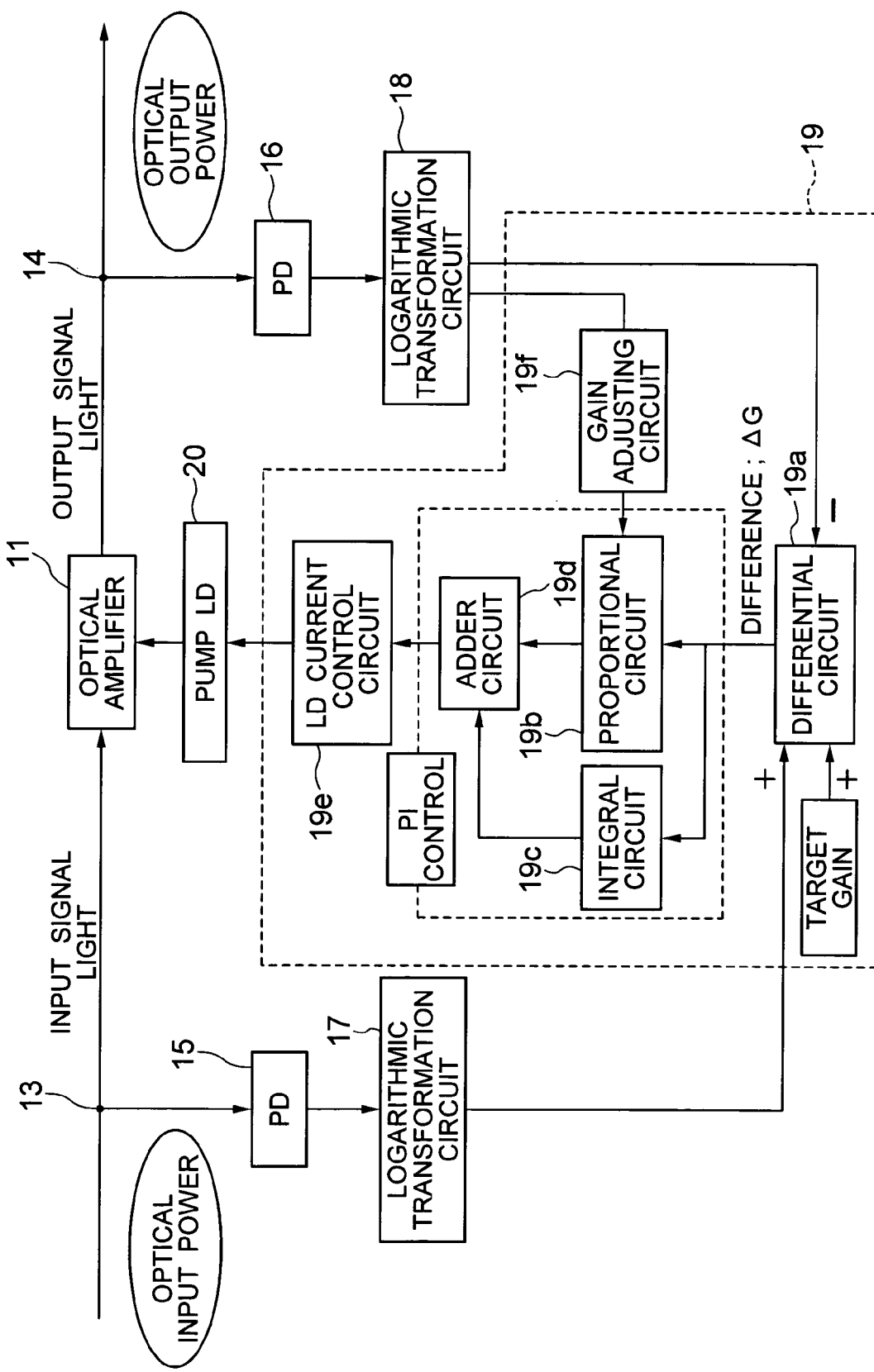
FIG. 22 is a diagram showing the optical amplifying apparatus including a function to adjust the proportional constant in correspondence with the optical output power in the fifth embodiment.

As one of the examples of the above apparatus, it is shown in FIG. 22 that the optical amplifying apparatus applying the AGC of the invention by the proportional integral control includes a function to adjust the proportional constant in correspondence to the optical output power. In the optical amplifying apparatus as shown in FIG. 22, the proportional constant of the proportional circuit 19b is adjusted in correspondence to the voltage of the optical output power from the logarithmic circuit 18 to optimize the control parameters of the control circuit 19.

Figure 23:
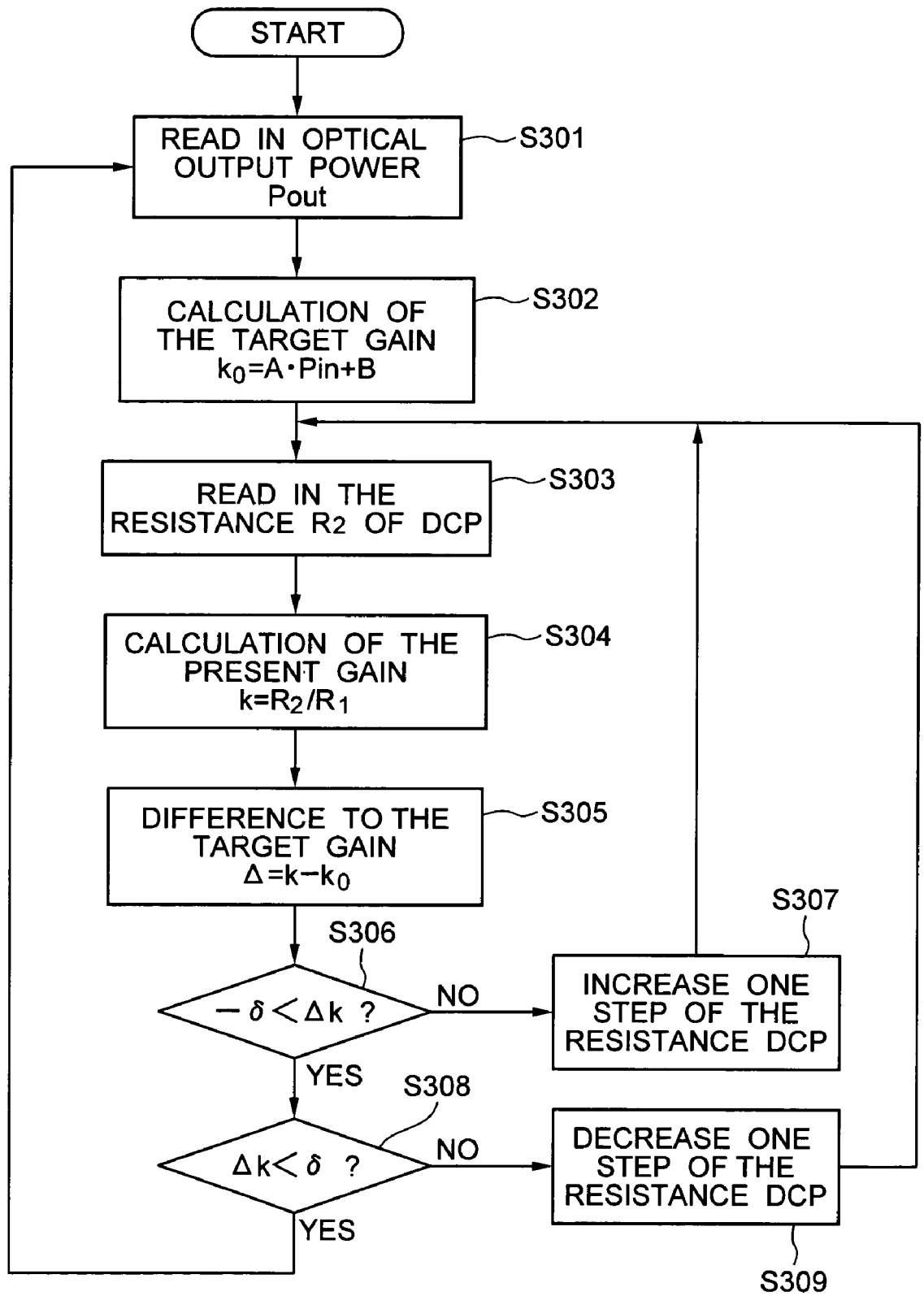
FIG. 23 is a flow chart showing an adjusting operation of the proportional constant by the optical amplifying apparatus including the proportional constant adjusting function as shown in FIG. 7 in the optical amplifying apparatus as shown in FIG. 22.

In order to adjust the proportional constant, the proportional circuit 19b comprises, for example as shown in FIG. 7, a comparator 19b1, a fixed resistor 19b2 and a variable resistor 19b3. Since as the variable resistor, a DCP is applied, the resistance of the variable resistor can be changed by means of the adjusting function of the proportional constant adjusting circuit 19f, even if the apparatus is under the operation, to adjust the proportional constant determined by the equation (1). The adjusting operation of the proportional constant of the above proportional circuit is shown in the flow chart in FIG. 23.

Figure 24:
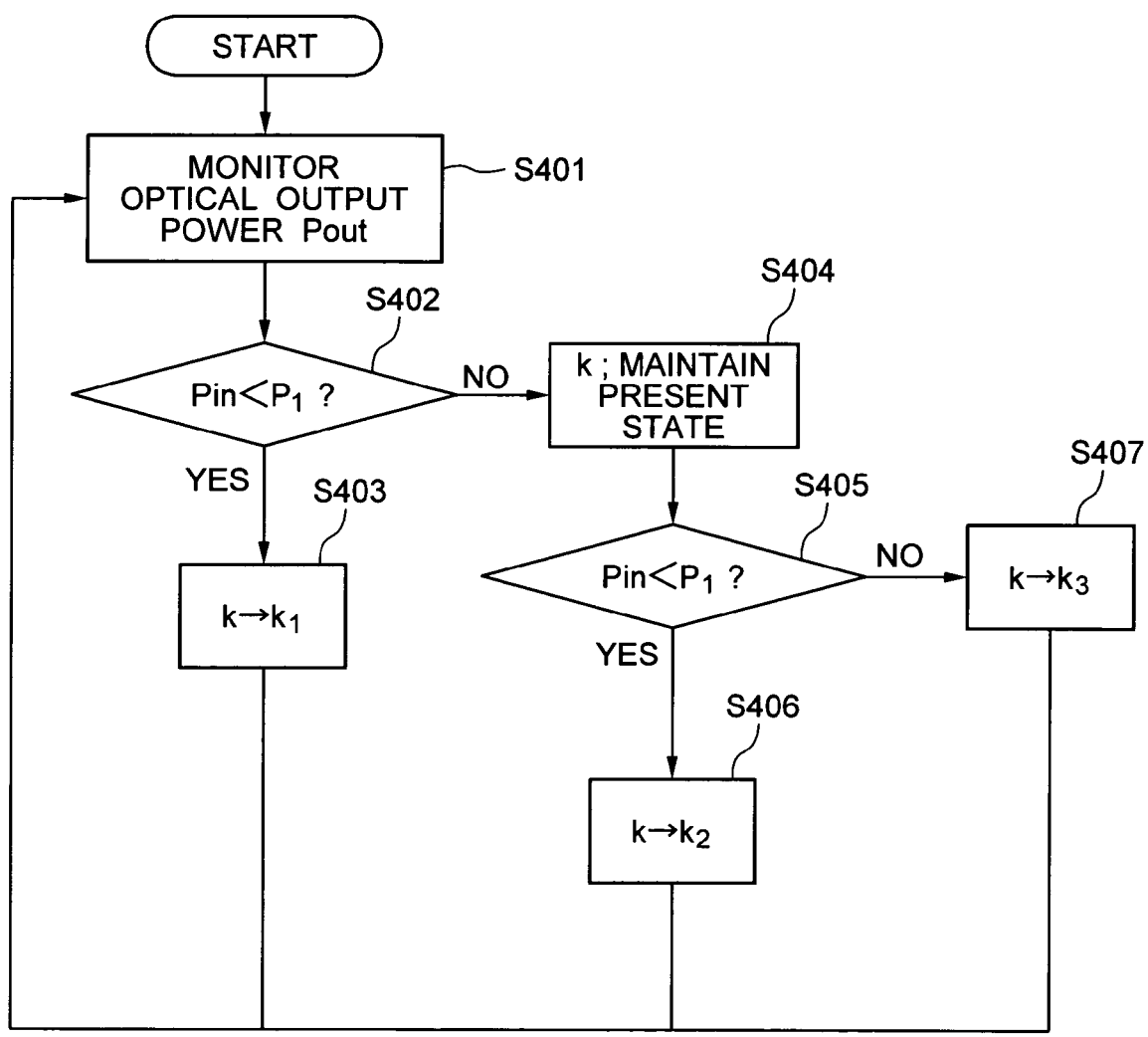
FIG. 24 is a flow chart showing an adjusting operation of the proportional constant by the optical amplifying apparatus including the control parameter adjusting function as shown in FIG. 11 in the optical amplifying apparatus as shown in FIG. 22.

In order to adjust the proportional constant, the proportional circuit may comprise, for example as shown in FIG. 11, a plurality of fixed resistors R21 to R2n having different resistance, and analog switches S1 to Sn. The proportional constant adjusting circuit 19f controls switching the analog switches S1 to Sn to change the resistors R21 to R2n connected to the comparator 19b1, thus enabling to adjust the proportional constant determined by the equation (1). The adjusting operation of the proportional constant of the above proportional circuit is shown in the flow chart in FIG. 24.

If the target gain of the optical amplifier 11 is always constant, the control parameters are adjusted in correspondence to the optical input power monitored by the monitor circuit 17, thus enabling to optimize the response time to realize the stable gain control of the optical amplifier. However, there are cases in which the gain or total output power of the optical amplifier must be changed according to the variation of the span loss or to the increase/decrease of wavelength channel. In this case, the optimization of the control parameters in correspondence to the optical input power may not obtain the appropriate control response, since the gain response time of the EDF substantially depends on the optical output power from the EDF.

Figure 25:
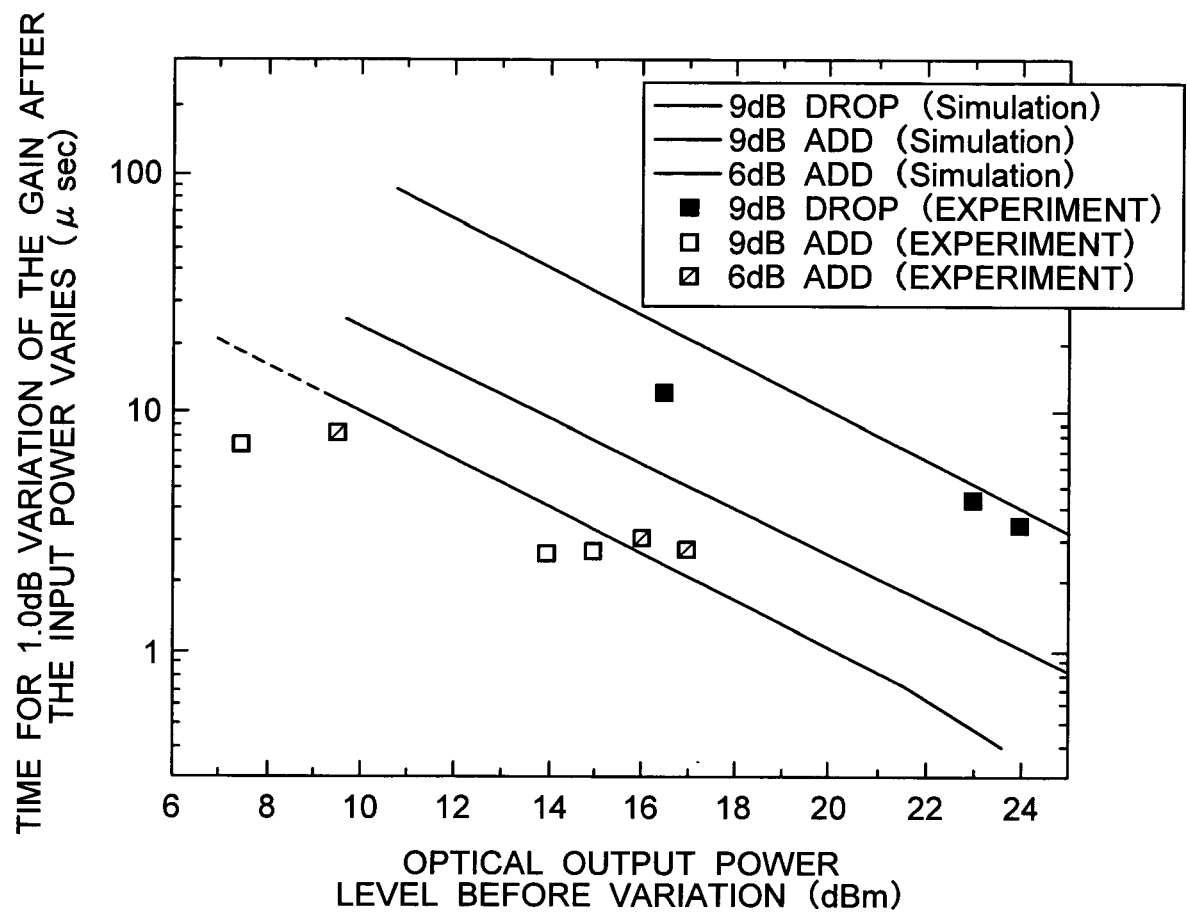
FIG. 25 is a graph plotting gain variation times of EDF in relation with the optical output power in case that the optical input/output power is increased or reduced (i.e., in case that the input power is abruptly varied) in the state that the output power of the pump laser diode is constant.

FIG. 25 is a graph plotting the time for 1 dB gain variation of EDF in relation with the optical output power in case that the optical input power is increased or reduced (i.e., in case that the input power is abruptly varied) under the condition that the output power of the pump laser diode is maintained constant. As depicted in FIG. 25, it is described in both results of the simulation and the experiment that the time for 1 dB gain variation of EDF becomes shorter corresponding to the increase of the optical output power.

Considering the above characteristics of time for gain variation against output power, the optical amplifying apparatus of this embodiment enables to optimize the control response of the optical amplifier even in the case that the gain or total output power of the optical amplifier is varied according to the variation of the span loss or to the increase/decrease of wavelength channel, since the control parameters of the control circuit 19 is adjusted against optical output power monitored by the monitor circuit 18.

As described above, in the optical amplifying apparatus of this embodiment, the optical output power to the optical amplifier is monitored by the optical power detecting device, and the control parameters are adjusted in correspondence to the monitored optical power. It is therefore possible to effectively adjust the control parameters even if the optical input power to the optical amplifier abruptly varies under operation. Thus, the response time of the control circuit is adjusted so as to improve the transient characteristics of the gain control of the optical amplifier and to enable to provide a stable constant gain control and high speed transmission without deterioration of the optical signal.

According to the optical amplifying method and optical amplifying apparatus of the invention, the following effect can be obtained.

Since the input/output power of the optical amplifier is monitored by means of the PD or logarithmic circuit to detect the gain, the difference between the detected gain and the target gain, and since the said difference is calculated by the AGC circuit, and since proportional integral control is implemented based on the difference to control the gain of the optical amplifier, the variation of the optical output power per one wavelength channel may be maintained small so as to suppress the affection to the transmission quality, and in addition, the space occupied by the optical fiber may be reduced so as to realize the downsizing of the apparatus.

Since the optical amplifying method and optical amplifying apparatus of the invention monitors input/output power of the optical amplifier which is varied by add/drop function of the optical signal of a prescribed wavelength produced by the wavelength division-multiplexing device, by means of the PD or logarithmic circuit to detect the gain, the difference between the detected gain and the target gain, and since said difference is calculated by the AGC circuit, and since the proportional integral control is implemented based on the difference to control the gain of the optical amplifier, the variation of the optical output power per one wavelength channel may be maintained small so as to suppress the affection to the transmission quality, in addition, the space occupied by the optical fiber may be reduced so as to realize the downsizing of the apparatus.

The optical amplifying method and optical amplifying apparatus of the invention enables the optical amplifying apparatus to control transient gain appropriately even if the optical input power to the optical amplifier abruptly varies under operation, since the optical input power of the optical amplifier is monitored by means of the PD or logarithmic circuit, and the control parameters in the AGC circuit are adjusted in correspondence to the monitored optical input power. Thus, the response time of the control circuit is optimized so as to improve the transient characteristics of the gain control of the optical amplifier and to enable to realize a stable optical transmission.

The optical amplifying method and optical amplifying apparatus of the invention enables the optical amplifying apparatus to control transient gain appropriately even if the optical input power to the optical amplifier abruptly varies under operation, since the optical input power of the optical amplifier is monitored, and since the optical input power from the upstream optical amplifier which is connected to the said amplifier is monitored, and since optical input power transmitted from the wavelength division-multiplex device which is connected to the said amplifier is monitored, and since the control parameters in the AGC circuit are adjusted in correspondence to the monitored optical input power.

The optical amplifying method and optical amplifying apparatus of the invention enables the optical amplifying apparatus to suppress the variation of output power per one wavelength channel when the optical input power to the optical amplifier abruptly varies under operation, since the proportional constant of the proportional circuit in the automatic constant gain control circuit is adjusted in correspondence to the optical input power, in order to optimize the control parameters against operational condition of the said optical amplifier.

Thus, the response time of the control circuit is adjusted so as to improve the transient characteristics of the gain control of the optical amplifier and to enable to realize a stable optical transmission.

Furthermore, the embodiment of the invention enables optical amplifying apparatus to stabilize the control of optical signal amplification as a result.

Since the optical amplified transmission system of the invention comprises multiple stages of the above mentioned optical amplifier which are connected in series on the optical transmission line, the transient characteristics of the gain control of the optical amplifier in the overall optical amplified transmission system is improved. Thus, the deterioration of the transmission characteristics of the optical signal is suppressed when the optical power varies and the optical power variation of the optical signal in multiple repeater terminals in series can be effectively reduced, thus enabling to realize a stable transmission of the optical signal.

The invention is not limited to the embodiments described above. Various modification of the embodiments of the invention may be made without departing from the spirit and scope thereof. For example, although the analog control of the AGC circuit is explained in the embodiment, the digital control of the AGC circuit applying a processing unit is also included in the present invention.

What is claimed is:

1. An optical amplifying method of an optical amplifier connected to an optical transmission line, the method comprising the steps of:
    detecting an optical input and output power of said optical amplifier;
    obtaining a difference between a target gain and a measured gain of said optical amplifier obtained based on the detected optical input and output power to produce an error signal;
    applying said error signal to each of a proportional calculation and an integral calculation to create respective proportional and integral control signals, and adding proportional and integral control signals to create a drive current of at least one pump laser diode provided in said optical amplifier;
    controlling the gain of said optical amplifier with the drive current; and
    adjusting a control parameter of the proportional calculator in response to the detected optical input power, said control parameter being a proportional constant by which said error signal is multiplied to form said proportional control signal, said proportional constant being represented by a function of the optical input power as a result of the adjusting the control parameter in response to the detected optical input power.

2. The optical amplifying method as claimed in claim 1, wherein said step of adjusting the control parameter includes adjusting the control parameter in response to a detected variation in optical input power resulting from adding or dropping an optical signal in a connected wavelength division multiplexing device.

3. An optical amplifier connected to an optical transmission line, comprising:
    means for detecting an optical input and output power of said optical amplifier;
    means for obtaining a difference between a target gain and a measured gain of said optical amplifier obtained based on the detected optical input and output power to produce an error signal;
    means for applying said error signal to each of a proportional calculation and an integral calculation to create respective proportional and integral control signals;
    means for adding the proportional and integral control signals to create a drive current of at least one pump laser diode provided in said optical amplifier;
    means for controlling the gain of said optical amplifier with the drive current; and
    means for adjusting a control parameter of the proportional calculator in response to the detected optical input power, said control parameter being a proportional constant by which said error signal is multiplied to form, said proportional control signal, said proportional constant being represented by a function of the optical input power as a result of the adjusting the control parameter in response to the detected optical input power.

4. The optical amplifier as claimed in claim 3, wherein said means for adjusting the control parameter includes means for adjusting the control parameter in response to a detected variation in optical input power resulting from adding or dropping an optical signal in a connected wavelength division multiplexing device.

5. An optical amplifier connected to an optical transmission line, comprising:
    a detector configured to detect an optical input power of said optical amplifier;
    a detector configured to detect an optical output power of said optical amplifier;
    a difference calculator configured to calculate a difference between a target gain and a measured gain of said optical amplifier obtained based on the detected optical input and output power to produce an error signal;
    a proportional calculator and an integral calculator each configured to operate on said error signal to create respective proportional and integral control signals;
    an adder configured to add the proportional and integral control signals to create a drive current of at least one pump laser diode provided in said optical amplifier;
    a gain controller configured to control the gain of said optical amplifier with the drive current; and
    a gain control adjuster configured to adjust a control parameter of the proportional calculator in response to the detected optical input power, said control parameter being a proportional constant by which said error signal is multiplied to form said proportional control signal, said proportional constant being represented by a function of the optical input power as a result of the adjusting the control parameter in response to the detected optical input power.

6. The optical amplifier as claimed in claim 5, wherein said gain control adjuster includes an adjuster configured to adjust the control parameter in response to a detected variation in optical input power resulting from adding or dropping an optical signal in a connected wavelength division multiplexing device.

7. An optical signal distribution system, comprising:
a first optical signal source;
the optical amplifier recited in claim 5; and
an optical fiber connecting the optical signal source and the optical amplifier.

8. The optical signal distribution system as claimed in claim 7, further comprising:
a second optical source;
a wavelength division multiplexer connecting the first and second optical sources to the optical fiber.

9. The optical amplifying method of claim 1, wherein the control parameter of the proportional calculator is increased according to an increase of optical input power.

10. The optical amplifier of claim 3, wherein the control parameter of the proportional calculator is increased according to the increase of optical input power.

11. The optical amplifier of claim 5, wherein the control parameter of the proportional calculator is increased according to the increase of optical input power.

* * * * *